United States Patent
Liu et al.

(10) Patent No.: US 12,355,516 B2
(45) Date of Patent: Jul. 8, 2025

(54) TERMINAL AND BASE STATION IN COMMUNICATION SYSTEM

(71) Applicant: NTT DOCOMO, INC., Tokyo (JP)

(72) Inventors: Wenjia Liu, Beijing (CN); Xiaolin Hou, Beijing (CN); Xin Wang, Beijing (CN); Yuki Matsumura, Tokyo (JP); Nadisanka Rupasinghe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 43 days.

(21) Appl. No.: 18/258,633

(22) PCT Filed: Dec. 29, 2020

(86) PCT No.: PCT/CN2020/140955
§ 371 (c)(1),
(2) Date: Jun. 21, 2023

(87) PCT Pub. No.: WO2022/141078
PCT Pub. Date: Jul. 7, 2022

(65) Prior Publication Data
US 2024/0048190 A1    Feb. 8, 2024

(51) Int. Cl.
*H04K 1/10* (2006.01)
*H04B 7/0417* (2017.01)
*H04B 7/0456* (2017.01)
*H04L 27/28* (2006.01)
*H04B 7/06* (2006.01)

(52) U.S. Cl.
CPC ......... *H04B 7/0417* (2013.01); *H04B 7/0456* (2013.01); *H04B 7/063* (2013.01)

(58) Field of Classification Search
CPC .... H04B 7/0417; H04B 7/0456; H04B 7/063; H04B 7/0469
USPC ......... 375/260, 295, 316, 219, 220
See application file for complete search history.

(56) References Cited

U.S. PATENT DOCUMENTS

2021/0167835 A1*  6/2021  Wang ............ H04B 7/0469

* cited by examiner

*Primary Examiner* — Phuong Phu
(74) *Attorney, Agent, or Firm* — Osha Bergman Watanabe & Burton LLP

(57) ABSTRACT

The present disclosure provides a terminal and a base station in a communication system. The terminal includes: a receiving unit configured to receive, from a base station, first information indicating a first parameter, where the first parameter indicates a number of candidate transform domain vectors regarding a subcarrier-level precoding matrix, and a value of the first parameter is smaller than a number of subcarriers of the communication system; the receiving unit being further configured to receive, from the base station, second information indicating a second parameter, where the second parameter indicates a number of transform domain vectors used to determine the subcarrier-level precoding matrix; and a control unit configured to determine, from the number of candidate transform domain vectors indicated by the first information, the number of transform domain vectors indicated by the second information.

10 Claims, 6 Drawing Sheets

TERMINAL AND BASE STATION IN COMMUNICATION SYSTEM

TECHNICAL FIELD

The present disclosure relates to a field of wireless communication, and more particularly to a method performed by a terminal in a communication system, a method performed by a base station in a communication system, as well as a corresponding terminal and base station.

BACKGROUND

In order to improve throughput of a communication system, a multi-antenna technology, such as Multiple Input Multiple Output (MIMO) technology, is proposed. In the scene where the multi-antenna technology is applied, in order to effectively eliminate multi-user interference, improve system capacity, and reduce signal processing difficulty of a receiver, it is proposed to apply a precoding technology at the transmitter side. In order to support the precoding technology, codebooks are designed.

Release 15 (which can be abbreviated as R15) of 5G New Radio (NR) has designed two types of codebooks, namely Type I codebook and Type II codebook. In the case where the Type I codebook is applied, one wideband codeword is selected, and Co-phase for cross polarization is calculated for each subband. In the case where the Type II codebook is applied, multiple wideband codewords are selected, and a complex Linear Combination (LC) coefficient for the multiple codewords is calculated for each subband. In addition, in order to reduce feedback overhead associated with complex linear combination coefficients used for all subbands, Release 16 (which can be abbreviated as R16) of NR has designed an enhanced Type II codebook, that is, a Frequency Domain (FD) compression scheme based on Discrete Fourier Transform (DFT) vectors is adopted to reduce feedback overhead.

However, the codebooks described above are designed for subbands, and thus an operation based on the codebooks described above is a subband-level operation. Specifically, in an example where the receiver is a terminal and the transmitter is a base station, the operation that the terminal determines a Precoding Matrix Indicator (PMI) and feeds back the PMI to the base station is a subband-level operation, or the operation (e.g., compression) that the terminal performs according to subband-level information (e.g., the LC coefficients mentioned above) is a subband-level operation, and the operation that the base station generates a precoding matrix according to the PMI is also a subband-level operation. Granularity of these operations is low, which limits performance of the communication system.

SUMMARY OF THE PRESENT DISCLOSURE

In order to overcome defects in the prior art, the present disclosure provides that codebook-based operation is a subcarrier-level operation, thereby improving performance of the communication system. Accordingly, the operation that the terminal determines a Precoding Matrix Indicator (PMI) and feeds back the PMI to the base station is a subcarrier-level operation or an operation based on subcarrier-level information, and the operation that the base station generates a precoding matrix according to the PMI can also be a subcarrier-level operation. The present disclosure further provides a method performed by a terminal, a method performed by a base station, as well as a corresponding terminal and base station in such situations, so as to reduce feedback overhead and further improve performance of the communication system.

According to an aspect of the present disclosure, there is provided a method performed by a terminal in a communication system, the method includes: receiving, from a base station in the communication system, first information indicating a first parameter, wherein the first parameter indicates a number of candidate transform domain vectors regarding a subcarrier-level precoding matrix, and a value of the first parameter is smaller than a number of subcarriers of the communication system; receiving, from the base station, second information indicating a second parameter, wherein the second parameter indicates a number of transform domain vectors used to determine the subcarrier-level precoding matrix; and determining, from the number of candidate transform domain vectors indicated by the first information, the number of transform domain vectors indicated by the second information.

According to an example of the present disclosure, wherein the first information includes the first parameter.

According to an example of the present disclosure, wherein the second information includes the second parameter.

According to an example of the present disclosure, wherein the second information is used to indicate a first factor corresponding to a value of the second parameter.

According to an example of the present disclosure, the method further includes: determining the value of the second parameter according to the first factor and the first parameter.

According to an example of the present disclosure, the method described above further includes: determining precoding matrix indication information according to at least the first information and the second information.

According to an example of the present disclosure, the method described above further includes: determining precoding matrix indication information according to at least the determined transform domain vectors.

According to an example of the present disclosure, the method described above further includes: receiving, from the base station, indication information indicating a subset of the candidate transform domain vectors, and determining, from the subset, the number of transform domain vectors indicated by the second information.

According to an example of the present disclosure, wherein the indication information includes third information indicating a third parameter, wherein a value of the third parameter indicates a number of vectors included in the subset of the candidate transform domain vectors.

According to an example of the present disclosure, wherein the third information includes the third parameter.

According to an example of the present disclosure, wherein the indication information includes fourth information indicating a fourth parameter, wherein the fourth parameter is used to determine vectors included in the subset of the candidate transform domain vectors.

According to an example of the present disclosure, wherein the fourth information includes the fourth parameter.

According to an example of the present disclosure, the method further includes: transmitting, to the base station, the precoding matrix indication information.

According to an example of the present disclosure, wherein the precoding matrix indication information is a precoding matrix indicator.

According to an example of the present disclosure, the method further includes: transmitting, to the base station, rank indication information, wherein the rank indication information is used to indicate a rank for the terminal, and a value of the rank for the terminal is greater than or equal to four.

According to another aspect of the present disclosure, there is provided a method performed by a base station in a communication system, the method includes: determining a first parameter, wherein the first parameter indicates a number of candidate transform domain vectors regarding a subcarrier-level precoding matrix, and a value of the first parameter is smaller than a number of subcarriers of the communication system; determining a second parameter, wherein the second parameter indicates a number of transform domain vectors used to determine the subcarrier-level precoding matrix; and transmitting, to a terminal in the communication system, first information indicating the first parameter and second information indicating the second parameter.

According to an example of the present disclosure, wherein the first information includes the first parameter.

According to an example of the present disclosure, wherein the second information includes the second parameter.

According to an example of the present disclosure, wherein the second information is used to indicate a first factor corresponding to a value of the second parameter.

According to an example of the present disclosure, the method further includes: determining a first set according to at least a value of a rank corresponding to the terminal, a number of wave beams and the first parameter, wherein the first set includes one or more first factors; and determining, from the first set, the first factor corresponding to the value of the second parameter according to the value of the first parameter and the value of the second parameter.

According to an example of the present disclosure, wherein the value of the first parameter is larger than a predetermined threshold, the predetermined threshold is smaller than the number of subcarriers of the communication system, the method further includes: transmitting, to the terminal, indication information indicating a subset of the candidate transform domain vectors, such that the terminal determines, from the subset, the number of transform domain vectors indicated by the second information.

According to an example of the present disclosure, wherein the indication information includes third information indicating a third parameter, wherein a value of the third parameter indicates a number of vectors included in the subset of the candidate transform domain vectors.

According to an example of the present disclosure, wherein the third information includes the third parameter.

According to an example of the present disclosure, wherein the indication information includes fourth information indicating a fourth parameter, wherein the fourth parameter is used to determine vectors included in the subset of the candidate transform domain vectors.

According to an example of the present disclosure, wherein the fourth information includes the fourth parameter.

According to an example of the present disclosure, the method further includes: receiving, from the terminal, the precoding matrix indication information; and generating the subcarrier-level precoding matrix according to the precoding matrix indication information.

According to an example of the present disclosure, wherein the precoding matrix indication information is a precoding matrix indicator.

According to another aspect of the present disclosure, there is provided a terminal, including: a receiving unit configured to receive, from a base station in a communication system, first information indicating a first parameter, wherein the first parameter indicates a number of candidate transform domain vectors regarding a subcarrier-level precoding matrix, and a value of the first parameter is smaller than a number of subcarriers of the communication system; the receiving unit being further configured to receive, from the base station, second information indicating a second parameter, wherein the second parameter indicates a number of transform domain vectors used to determine the subcarrier-level precoding matrix; and a control unit configured to determine, from the number of candidate transform domain vectors indicated by the first information, the number of transform domain vectors indicated by the second information.

According to an example of the present disclosure, wherein the first information includes the first parameter.

According to an example of the present disclosure, wherein the second information includes the second parameter.

According to an example of the present disclosure, wherein the second information is used to indicate a first factor corresponding to a value of the second parameter.

According to an example of the present disclosure, the control unit is further configured to determine the value of the second parameter according to the first factor and the first parameter.

According to an example of the present disclosure, the control unit is further configured to determine precoding matrix indication information according to at least the first information and the second information.

According to an example of the present disclosure, the control unit is further configured to determine precoding matrix indication information according to at least the determined transform domain vectors.

According to an example of the present disclosure, the receiving unit is further configured to receive, from the base station, indication information indicating a subset of the candidate transform domain vectors, and the control unit is configured to determine, from the subset, the number of transform domain vectors indicated by the second information.

According to an example of the present disclosure, wherein the indication information includes third information indicating a third parameter, wherein a value of the third parameter indicates a number of vectors included in the subset of the candidate transform domain vectors.

According to an example of the present disclosure, wherein the third information includes the third parameter.

According to an example of the present disclosure, wherein the indication information includes fourth information indicating a fourth parameter, wherein the fourth parameter is used to determine vectors included in the subset of the candidate transform domain vectors.

According to an example of the present disclosure, wherein the fourth information includes the fourth parameter.

According to an example of the present disclosure, the terminal further includes: a transmitting unit configured to transmit, to the base station, the precoding matrix indication information.

According to an example of the present disclosure, wherein the precoding matrix indication information is a precoding matrix indicator.

According to an example of the present disclosure, the terminal further includes: a transmitting unit configured to transmit, to the base station, rank indication information, wherein the rank indication information is used to indicate a rank for the terminal, and a value of the rank for the terminal is greater than or equal to four.

According to another aspect of the present disclosure, there is provided a base station, including: a control unit configured to determine a first parameter, wherein the first parameter indicates a number of candidate transform domain vectors regarding a subcarrier-level precoding matrix, and a value of the first parameter is smaller than a number of subcarriers of a communication system; the control unit is further configured to determine a second parameter, wherein the second parameter indicates a number of transform domain vectors used to determine the subcarrier-level precoding matrix; and a transmitting unit configured to transmit, to a terminal in the communication system, first information indicating the first parameter and second information indicating the second parameter.

According to an example of the present disclosure, wherein the first information includes the first parameter.

According to an example of the present disclosure, wherein the second information includes the second parameter.

According to an example of the present disclosure, wherein the second information is used to indicate a first factor corresponding to a value of the second parameter.

According to an example of the present disclosure, the control unit is further configured to determine a first set according to at least a value of a rank corresponding to the terminal, a number of wave beams and the first parameter, wherein the first set includes one or more first factors; and to determine, from the first set, the first factor corresponding to the value of the second parameter according to the value of the first parameter and the value of the second parameter.

According to an example of the present disclosure, wherein the value of the first parameter is larger than a predetermined threshold, the predetermined threshold is smaller than the number of subcarriers of the communication system, the transmitting unit is further configured to transmit, to the terminal, indication information indicating a subset of the candidate transform domain vectors, such that the terminal determines, from the subset, the number of transform domain vectors indicated by the second information.

According to an example of the present disclosure, wherein the indication information includes third information indicating a third parameter, wherein a value of the third parameter indicates a number of vectors included in the subset of the candidate transform domain vectors.

According to an example of the present disclosure, wherein the third information includes the third parameter.

According to an example of the present disclosure, wherein the indication information includes fourth information indicating a fourth parameter, wherein the fourth parameter is used to determine vectors included in the subset of the candidate transform domain vectors.

According to an example of the present disclosure, wherein the fourth information includes the fourth parameter.

According to an example of the present disclosure, the base station further includes: a receiving unit configured to receive, from the terminal, precoding matrix indication information; and the control unit is further configured to generate the subcarrier-level precoding matrix according to the precoding matrix indication information.

According to an example of the present disclosure, wherein the precoding matrix indication information is a precoding matrix indicator.

The method performed by a terminal, the method performed by a base station, as well as the corresponding terminal and base station according to the above aspects of the present disclosure can, under the condition of applying the subcarrier-level precoding technology, reduce feedback overhead related to precoding from the terminal to the base station, thereby improving performance of the communication system.

BRIEF DESCRIPTION OF DRAWINGS

The above and other objects, features and advantages of the present disclosure will become more apparent by describing embodiments of the present disclosure in more detail with reference to accompanying drawings. The accompanying drawings are to provide a further understanding of the embodiments of the present disclosure, constitute a part of the specification, serve to explain the present disclosure together with the embodiments of the present disclosure, and do not constitute a limitation to the present disclosure. In the drawings, like reference numerals generally represent like parts or steps.

DETAILED DESCRIPTION

Figure 1:
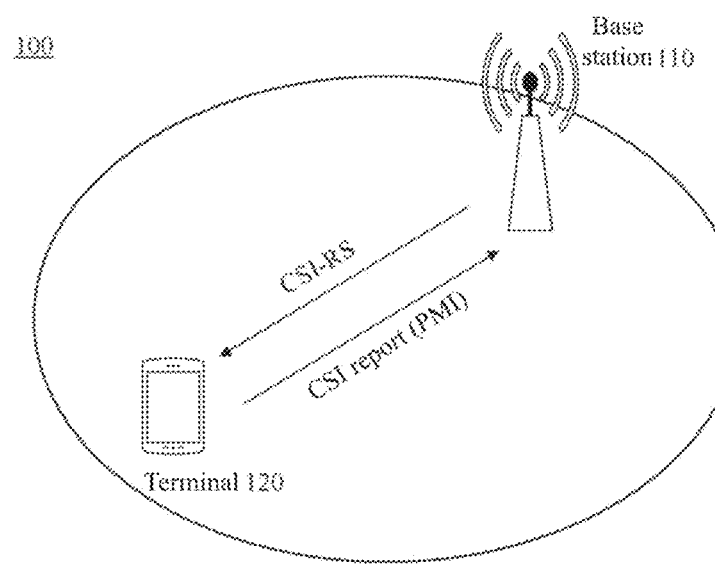
FIG. 1 shows a schematic diagram of a wireless communication system in which the embodiments of the present disclosure may be applied.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be understood that the embodiments described herein are merely illustrative and should not be construed as limiting the scope of the present disclosure.

First, a wireless communication system in which the embodiments of the present disclosure may be applied will be described with reference to FIG. 1. FIG. 1 shows a schematic diagram of a wireless communication system in which the embodiments of the present disclosure may be applied. The wireless communication system 100 shown in FIG. 1 may be a 5G communication system, and may also be any other types of wireless communication system, such as a 6G communication system and the like. Hereinafter, the embodiments of the present disclosure are described by taking a 5G communication system as an example, but it should be recognized that the following description may also be applied to other types of wireless communication systems.

As shown in FIG. 1, the wireless communication system 100 may include a base station 110 and a terminal 120, and the base station 110 is a serving base station of the terminal 120. The base station 110 may transmit a Channel State Information Reference Signal (CSI-RS) to the terminal 120. The terminal 120 may measure the CSI-RS, determine a channel state according to a measurement result, and determine a Precoding Matrix Indicator (PMI). The terminal 120 may contain the PMI in a CSI report and transmit the CSI report to the base station 110, thus realizing feedback of the PMI to the base station 110. The base station 110 may generate a precoding matrix according to the PMI and then apply the precoding matrix in downlink transmission from the base station 110 to the terminal 120.

The base station described herein may provide a communication coverage for a specific geographical area, which may be referred to as a cell, a Node B, a gNB, a 5G Node B, an access point and/or a transmitting and receiving point, etc. The terminal described herein may include various types of terminals, such as a User Equipment (UE), a mobile terminal (or referred to as a mobile station) or a fixed terminal, however, for the sake of convenience, terminal and UE are sometimes used interchangeably hereinafter.

It should be recognized that although only one base station and one terminal are shown in FIG. 1, the wireless communication system may include more base stations and/or more terminals, one base station may serve multiple terminals, and one terminal may also be served by multiple base stations.

In the process that the terminal determines the PMI described above, the terminal uses a corresponding codebook according to configuration. In the prior art, the codebook is designed for subbands of the wireless communication system, and accordingly, precoding and/or CSI feedback are subband-level operations. Granularity of these operations is low, which limits performance of the communication system.

In order to overcome the defects in the prior art, the present disclosure provides subcarrier-level precoding and/or CSI feedback, which improves operation granularity, thereby improving performance of the communication system. Specifically, subcarrier-level precoding and/or CSI feedback can be realized based on an existing enhanced Type II codebook. For example, parameters and operations related to subbands as involved in the application process of the existing enhanced Type II codebook may be modified to parameters and operations related to subcarriers, which may be referred to as an enhanced Frequency Domain (eFD) compression scheme. In addition, LC coefficients may be jointly designed in the spatial domain and the frequency domain, and further, parameters and operations related to subbands as involved in the application process of the existing enhanced Type II codebook may be modified to parameters and operations related to subcarriers, which may be referred to as an enhanced Transform Domain Precoding (eTDP) compression scheme, where the transform domain refers to a domain resulted after transforming the frequency domain, such as a delay domain.

In the case where the wireless communication system supports subcarrier-level precoding and/or CSI feedback, the terminal may select, for each layer, from candidate transform domain vectors of a first number, transform domain vectors of a second number, and report the selected second number of transform domain vectors to the base station (e.g., information indicating the selected second number of transform domain vectors is used as a part of a precoding matrix indicator). In the precoding technology for subbands, the number of candidate transform domain vectors may be determined according to the number of subbands. Similar to the precoding technology for subbands, in the precoding technology for subcarriers, the first number may be the number of subcarriers of the wireless communication system, and the second number is a value determined based at least on a rank corresponding to the terminal. However, since one subband may include multiple subcarriers, the number of subcarriers of the wireless communication system is larger than the number of subbands of the wireless communication system, that is, the first number mentioned above is larger. When the first number is larger, selecting the second number of transform domain vectors from the first number of candidate transform domain vectors, and feeding back the selected second number of transform domain vectors to the base station results in a large feedback overhead. Therefore, how to reduce feedback overhead is an aspect that needs to be considered.

Specific implementations of the technical solutions for reducing feedback overhead disclosed in the present disclosure will be described below from perspectives of the terminal and the base station, respectively.

Figure 2:
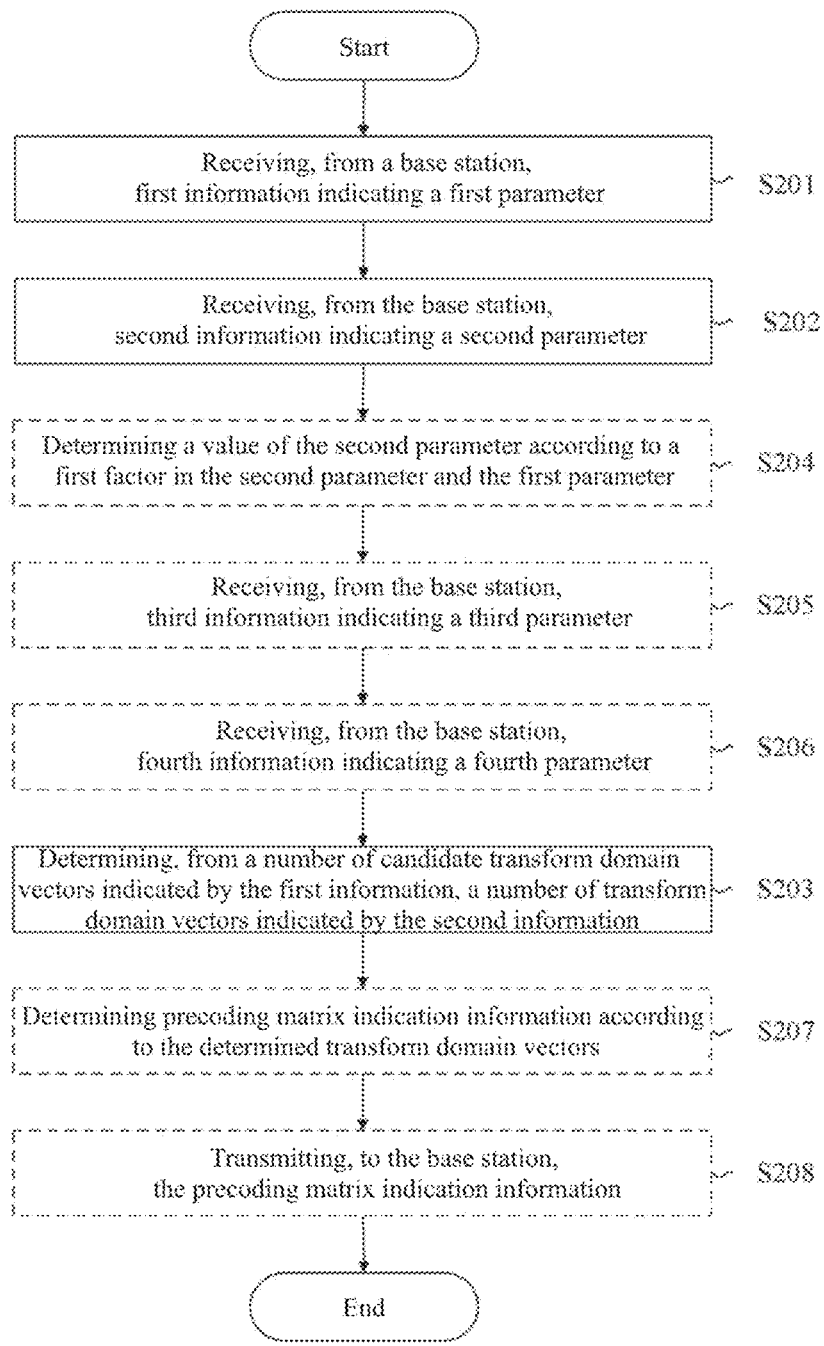
FIG. 2 shows a flowchart of a method performed by a terminal according to an embodiment of the present disclosure.

First, a method performed by a terminal according to an embodiment of the present disclosure will be described with reference to FIG. 2. FIG. 2 shows a flowchart of a method 200 performed by a terminal according to an embodiment of the present disclosure. As shown in FIG. 2, in step S201, a terminal receives, from a base station in the communication system, first information indicating a first parameter, where the first parameter indicates a number of candidate transform domain vectors regarding a subcarrier-level precoding matrix, and a value of the first parameter is smaller than a number of subcarriers of the communication system. In step S202, the terminal receives, from the base station, second information indicating a second parameter, where the second parameter indicates a number of transform domain vectors used to determine the subcarrier-level precoding matrix. Thereafter, in step S203, the terminal determines, from the number of candidate transform domain vectors indicated by the first information, the number of transform domain vectors indicated by the second information.

By introducing one new parameter, i.e., the first parameter, the present disclosure reduces the number of candidate transform domain vectors regarding the subcarrier-level precoding matrix from the number (e.g., it may be represented as $N_3$) of subcarriers of the communication system to a value of the first parameter. Since the number of candidate transform domain vectors regarding the subcarrier-level precoding matrix is reduced, feedback overhead caused by selecting the transform domain vectors used to determine the subcarrier-level precoding matrix from the candidate transform domain vectors, and feeding back the selected transform domain vectors to the base station is reduced correspondingly.

The subcarrier-level precoding matrix in the present disclosure is different from a subband-level precoding matrix in the prior art. Specifically, in the prior art, a codebook used for the precoding technology and/or CSI feedback is a codebook designed for subbands, so a precoding matrix determined based on this codebook is a subband-level precoding matrix. However, in the present disclosure, the codebook used for the precoding technology and/or CSI feedback is a codebook designed for subcarriers, so a precoding matrix determined based on this codebook is a subcarrier-level precoding matrix. In the present disclosure, the subcarrier-level precoding matrix may also be referred to as a precoding matrix used for subcarriers, or a precoding matrix directed for subcarriers.

According to an example of the present disclosure, the first information in step S201 may include a first parameter. For example, the first information may include only the first parameter, that is, the first information is the first parameter. As another example, the first information may not only include the first parameter, but also include other information (e.g., other configuration information transmitted by the base station to the terminal).

Furthermore, according to an example of the present disclosure, the first information in step S201 may also be used to indicate a value range of the first parameter. In this example, the terminal may determine the value range of the first parameter according to the first information, select one value from the value range, and take the selected value as the value of the first parameter.

Furthermore, the first parameter in step S201 may be represented as $M_{max}$, and its value is smaller than the number (i.e., $N_3$ mentioned above) of subcarriers of the communication system and larger than the number (e.g., which may be represented as No) of subbands of the communication system. Alternatively, the value of the first parameter in step S201 may be less than the number ($N_3$) of subcarriers of the communication system, and less than or equal to the number ($N_0$) of subbands of the communication system.

Furthermore, in the present disclosure, the transform domain may be a domain resulted after transforming the frequency domain, such as a delay domain. The candidate transform domain vectors in step S201 may be Discrete Fourier Transform (DFT) vectors.

Furthermore, the base station may transmit the first information to the terminal via higher layer signaling. In an example where the higher layer signaling is Radio Resource Control (RRC) signaling or Media Access Control (MAC) Control Element (CE), the base station may transmit the first information to the terminal via RRC signaling or MAC CE. Accordingly, in step S201, the terminal may receive the first information from the base station via RRC signaling or MAC CE.

Furthermore, the base station may transmit the first information to the terminal via lower layer signaling. In an example where the lower layer signaling is Downlink Control Information (DCI), the base station may transmit the first information to the terminal via DCI. Accordingly, in step S201, the terminal may receive the first information from the base station via DCI.

In the present disclosure, the base station can not only inform the terminal of the number ($M_{max}$) of candidate transform domain vectors regarding the subcarrier-level precoding matrix, but also can inform the terminal of the number of transform domain vectors that the terminal should select from the candidate transform domain vectors, such that the terminal can determine precoding matrix indication information. Therefore, in step S202, the terminal receives, from the base station, second information indicating a second parameter, where the second parameter indicates the number of transform domain vectors used to determine the subcarrier-level precoding matrix, and the value of the second parameter is smaller than that of the first parameter. The second parameter may be represented as $M_v$ and is a positive integer, where v represents a rank corresponding to the terminal and is a positive integer.

Furthermore, according to an example of the present disclosure, the second information in step S202 may explicitly indicate the second parameter. For example, the second information may include the second parameter. In this example, the base station may transmit the second information to the terminal via higher layer signaling such as RRC or MAC CE. Accordingly, in step S202, the terminal may receive the second information from the base station via higher layer signaling such as RRC or MAC CE, thereby obtaining the second parameter. Alternatively, the base station may transmit the second information to the terminal via lower layer signaling such as DCI. Accordingly, in step S202, the terminal may receive the second information from the base station via lower layer signaling such as DCI, thereby obtaining the second parameter.

According to another example of the present disclosure, the second information in step S202 may implicitly indicate the second parameter. For example, the second information may be used to indicate a first factor corresponding to a value of the second parameter. The first factor may be represented as $p_v$, and its value is greater than zero and less than one, that is, $0<p_v<1$. In this example, after the base station determines the number ($M_{max}$) of candidate transform domain vectors regarding the subcarrier-level precoding matrix and the number ($M_v$) of transform domain vectors that the terminal should select from the candidate transform domain vectors, the base station may determine the first factor ($p_v$) corresponding to the $M_v$ according to a preset rule. For example, the base station may determine the first factor ($p_v$) corresponding to the $M_v$ from a set of first factors according to the number ($M_{max}$) of candidate transform domain vectors regarding the subcarrier-level precoding matrix, the number ($M_v$) of transform domain vectors that the terminal should select from the candidate transform domain vectors, and the following Formula (1):

$$M_v = \lceil p_v M_{max} \rceil \qquad \text{Formula (1)}$$

Alternatively, in this example, the base station may determine the number ($M_{max}$) of candidate transform domain vectors regarding the subcarrier-level precoding matrix and the first factor ($p_v$), without determining the number ($M_v$) of transform domain vectors that the terminal should select from the candidate transform domain vectors. For example, the base station may determine one first factor ($p_v$) from the set of first factors and notify the terminal.

It should be recognized that step S202 may be performed after step S201, or may be performed before step S201, or may be performed simultaneously with step S201. FIG. 2 only shows a schematic diagram of performing step S202 after step S201, and does not show an example of performing step S202 before step S201 or an example of performing step S201 and step S202 simultaneously.

Furthermore, the transform domain vectors used to determine the subcarrier-level precoding matrix in step S202, that is, the transform domain vectors selected by the terminal from the candidate transform domain vectors, may also be referred to as transform domain base vectors. In an example where the transform domain vectors are DFT vectors, the transform domain vectors may also be referred to as DFT base vectors. These terms can be used interchangeably for convenience.

Furthermore, when determining the precoding matrix, in addition to the transform domain vectors in step S202, multiple spatial vectors (also referred to as spatial beams, or spatial codewords, or wideband codewords, or wideband spatial codewords, etc.) are further needed, for example, L spatial vectors, where L is a positive integer. Each spatial vector has a frequency domain weighting coefficient. The transform domain vectors in step S202 may be used to transform and compress frequency domain weighting coefficients of the spatial domain vectors (e.g., transform them to the delay domain first, and then compress in the delay domain). However, since the spatial vectors are not related to the technical solution of the present disclosure, description related to the spatial vectors is omitted in the present disclosure.

Furthermore, as described above, the second parameter may be implicitly indicated by the first factor corresponding to the value of the second parameter. In this case, the method 200 may further include step S204. Step S204 may be performed after step S202 and before step S203. In step S204, the terminal may determine the value of the second parameter according to the first factor and the first parameter. Specifically, the terminal may determine the value of the second parameter according to a value of the first factor and the value of the first parameter. For example, the terminal may determine the value of the second parameter by Formula (1) described above.

After step S204, the terminal may determine the precoding matrix indication information according to at least the first information and the second information. For example, the terminal may determine the precoding matrix indication information according to at least the first parameter indicated by the first information and the second parameter indicated by the second information.

Alternatively, the terminal performs step S203 after step S204. In step S203, the terminal selects the number of transform domain vectors indicated by the second information from the number of candidate transform domain vectors indicated by the first information. For example, the terminal may select the number of transform domain vectors indicated by the second information from the number of candidate transform domain vectors indicated by the first information according to a position of a channel tap (e.g., the terminal may estimate the position of the channel tap according to downlink channel information obtained by measuring CSI-RS) or other selection criteria or methods. For example, the terminal may select $M_v$ transform domain vectors from $M_{max}$ candidate transform domain vectors used to determine the subcarrier-level precoding matrix according to the position of the channel tap. Through step S203, the terminal may determine the precoding matrix indication information according to at least the selected transform domain vector in step S207 which will be described later. That is, the terminal may select $M_v$ transform domain vectors from $M_{max}$ candidate transform domain vectors regarding the subcarrier-level precoding matrix, and determine the precoding matrix indication information according to at least the selected $M_v$ transform domain vectors.

When the value of the first parameter indicated by the first information is small, that is, the number ($M_{max}$) of candidate transform domain vectors regarding the subcarrier-level precoding matrix is small, the terminal may directly select $M_v$ transform domain vectors from the $M_{max}$ candidate transform domain vectors. When the value of the first parameter indicated by the first information is large, that is, the number ($M_{max}$) of candidate transform domain vectors regarding the subcarrier-level precoding matrix is large, the terminal may determine an Intermediate Subset (which may be abbreviated as InS or subset) of the candidate transform domain vectors, and select $M_v$ transform domain vectors from this subset to further reduce feedback overhead. For example, the terminal may receive indication information indicating a subset of the candidate transform domain vectors from the base station, and determine the number of transform domain vectors indicated by the second information from the subset (i.e., selecting $M_v$ transform domain vectors from the subset).

For example, the terminal may determine whether the value of the first parameter indicated by the first information is less than a preset threshold, the preset threshold may be less than the number (i.e., $N_3$ mentioned above) of subcarriers of the communication system. When the value of the first parameter indicated by the first information is less than or equal to the preset threshold, the terminal may directly select $M_v$ transform domain vectors from $M_{max}$ candidate transform domain vectors. When the value of the first parameter indicated by the first information is greater than the preset threshold, the terminal may determine a subset (InS) of the candidate transform domain vectors, and select $M_v$ transform domain vectors from the subset to further reduce feedback overhead. In an example where the preset threshold is equal to 19, when the value of the first parameter indicated by the first information is less than or equal to the preset threshold (i.e., $M_{max}$<19), the terminal may directly select $M_v$ transform domain vectors from $M_{max}$ candidate transform domain vectors; when the value of the first parameter indicated by the first information is greater than the preset threshold (i.e., $M_{max}$>19), the terminal may determine a subset (InS) of the candidate transform domain vectors, and select $M_v$ transform domain vectors from the subset to further reduce feedback overhead.

According to an example of the present disclosure, when determining the subset (InS) of the candidate transform domain vectors, the terminal further needs two parameters, namely a third parameter and a fourth parameter. The third parameter may be represented as $N_3'$, and its value may indicate the number of vectors included in the subset (InS) of the candidate transform domain vectors (also referred to as a size of the subset), or the number of subsets (InSs) of the candidate transform domain vectors. The number of vectors included in the subset (InS) of the candidate transform domain vectors is greater than the number ($M_v$) of transform domain vectors that the terminal should select from the candidate transform domain vectors, which may be 2 $M_v$, for example. That is, $N_3'$ may be equal to 2 $M_v$. In addition, the fourth parameter may be used to determine the vectors included in the subset of the candidate transform domain vectors, which may be represented as $M_{initial}$. A value range of the fourth parameter may be specified by a wireless communication standard specification (e.g., 3GPP standard specification), and the value range may include multiple values of the fourth parameter. For example, the value range of the fourth parameter may be related to the third parameter, such as $M_{initial} \in \{-N_3'+1, -N_3'+, \ldots, 0\}$.

The terminal and the base station may negotiate the value of the third parameter ($N_3'$) and the value of the fourth parameter ($M_{initial}$) in advance. According to a first example of the present disclosure, the terminal may determine the value of the third parameter and the value of the fourth parameter, and report the value of the third parameter and the value of the fourth parameter determined by itself to the base station. According to a second example of the present disclosure, the base station may determine the value of the third parameter and the value of the fourth parameter, and inform the terminal of the value of the third parameter and the value of the fourth parameter determined by itself. According to a third example of the present disclosure, the terminal may determine the value of the third parameter and report the value of the third parameter determined by itself to the base station, and the base station may determine the value of the fourth parameter and inform the terminal of the value of the fourth parameter determined by itself. According to a fourth example of the present disclosure, the base station may determine the value of the third parameter and inform the terminal of the value of the third parameter determined by itself, and the terminal may determine the value of the fourth parameter and report the value of the fourth parameter determined by itself to the base station.

In the first example where the terminal determines the value of the third parameter ($N_3'$) and the value of the fourth parameter ($M_{initial}$), a wireless communication standard specification (e.g., 3GPP standard specification) may specify a value range of the third parameter, and this value range may include multiple values of the third parameter. The terminal may select one value from the value range of the third parameter, and take the selected value as the value of the third parameter. In addition, the terminal may report the selected value of the third parameter to the base station. For example, the terminal may take the value of the third parameter as a part of the PMI and feed back the PMI to the base station, thus realizing report of the value of the third parameter to the base station by the terminal. In addition, the terminal may select one value from a value range of the fourth parameter, and take the selected value as the value of the fourth parameter. In addition, the terminal may report the selected value of the fourth parameter to the base station. For example, the terminal may take the value of the fourth parameter as a part of the PMI and feed back the PMI to the base station, thus realizing report of the value of the fourth parameter to the base station by the terminal. In addition, in this first example, since the value range of the third parameter may include multiple values of the third parameter and the value range of the fourth parameter may include multiple values of the fourth parameter, the terminal may determine multiple subsets. The terminal may select one subset from the multiple subsets, and then select $M_v$ transform domain vectors in the selected subset.

Furthermore, in the second example where the base station determines the value of the third parameter ($N_3'$) and the value of the fourth parameter ($M_{initial}$), a wireless communication standard specification (e.g., 3GPP standard specification) may specify the value range of the third parameter ($N_3'$), and this value range may include multiple values of the third parameter. The base station may select one value from the value range of the third parameter, and take the selected value as the value of the third parameter. The base station may inform the terminal of the selected value of the third parameter. In addition, the base station may select one value from the value range of the fourth parameter ($M_{initial}$), and take the selected value as the value of the fourth parameter. The base station may inform the terminal of the selected value of the fourth parameter. In addition, in this second example, since the base station informs the terminal of the selected value of the third parameter and the selected value of the fourth parameter, the terminal may determine only one subset. The terminal may select $M_v$ transform domain vectors from the determined subset.

For example, the base station may include third information indicating the third parameter ($N_3'$) and fourth information indicating the fourth parameter ($M_{initial}$) in one piece of indication information, and transmit the piece of indication information to the terminal. For example, the base station may transmit indication information indicating a subset of the candidate transform domain vectors to the terminal, such that the terminal may determine the number of transform domain vectors indicated by the second information from the subset. The indication information may include the third information indicating the third parameter ($N_3'$) and the fourth information indicating the fourth parameter ($M_{initial}$). The third information may include the third parameter. The fourth information may include the fourth parameter. Accordingly, the terminal may receive the indication information indicating the subset of the candidate transform domain vectors from the base station, and determine the number of transform domain vectors indicated by the second information from the subset.

As another example, the base station may transmit the third information indicating the third parameter ($N_3'$) and the fourth information indicating the fourth parameter ($M_{initial}$) to the terminal, respectively.

Specifically, the base station may transmit the third information indicating the third parameter ($N_3'$) to the terminal. The third information may include the third parameter. Accordingly, the terminal may receive the third information indicating the third parameter from the base station, and obtain the third parameter according to the third information, so as to determine the value of the third parameter (e.g., step S205 in FIG. 2). For example, the base station may transmit the third information to the terminal via higher layer signaling such as RRC or MAC CE. Accordingly, the terminal may receive the third information from the base station via higher layer signaling such as RRC or MAC CE, thereby obtaining the third parameter and determining the value of the third parameter. Alternatively, the base station may transmit the third information to the terminal via lower layer signaling such as DCI. Accordingly, the terminal may receive the third information from the base station via lower layer signaling such as DCI, thereby obtaining the third parameter and determining the value of the third parameter.

Furthermore, the base station may transmit fourth information indicating the fourth parameter to the terminal. The fourth information may include the fourth parameter. Accordingly, the terminal may receive the fourth information indicating the fourth parameter from the base station and obtain the fourth parameter according to the fourth information, so as to determine the value of the fourth parameter (e.g., step S206 in FIG. 2). For example, the base station may transmit the fourth information to the terminal via higher layer signaling such as RRC or MAC CE. Accordingly, the terminal may receive the fourth information from the base station via higher layer signaling such as RRC or MAC CE, thereby obtaining the fourth parameter and determining the value of the fourth parameter. Alternatively, the base station may transmit the fourth information to the terminal via lower layer signaling such as DCI. Accordingly, the terminal may receive the fourth information from the base station via lower layer signaling such as DCI, thereby obtaining the fourth parameter and determining the value of the fourth parameter.

Furthermore, in the third example where the terminal determines the value of the third parameter ($N_3'$) and the base station determines the value of the fourth parameter ($M_{initial}$), a wireless communication standard specification (e.g., 3 GPP standard specification) may specify the value range of the third parameter ($N_3'$), and this value range may include multiple values of the third parameter. The terminal may select one value from the value range of the third parameter, and take the selected value as the value of the third parameter. In addition, the terminal may report the selected value of the third parameter to the base station. For example, the terminal may take the value of the third parameter as a part of the PMI and feed back the PMI to the base station, thus realizing report of the value of the third parameter to the base station by the terminal. In addition, the base station may select one value from the value range of the fourth parameter ($M_{initial}$), and take the selected value as the value of the fourth parameter. The base station may inform the terminal of the selected value of the fourth parameter. For example, the base station may transmit the fourth information indicating the fourth parameter to the terminal via higher layer signaling such as RRC or MAC CE or lower layer signaling such as DCI, and the fourth information may include the fourth parameter. Accordingly, the terminal may receive the fourth information indicating the fourth parameter from the base station via higher layer signaling such as RRC or MAC CE or lower layer signaling such as DCI, and obtain the fourth parameter according to the fourth information, thereby determining the value of the fourth parameter. In addition, in this third example, although the base station informs the terminal of the selected value of the fourth parameter, since the value range of the third parameter may include multiple values of the third parameter, the terminal may still determine multiple subsets. The terminal may select a subset from the multiple subsets, and then select $M_v$ transform domain vectors in the selected subset.

Furthermore, in the fourth example where the base station determines the value of the third parameter ($N_3'$) and the terminal determines the value of the fourth parameter ($M_{initial}$), a wireless communication standard specification (e.g., 3GPP standard specification) may specify the value range of the third parameter ($N_3'$), and this value range may include multiple values of the third parameter. The base station may select one value from the value range of the third parameter, and take the selected value as the value of the third parameter. The base station may inform the terminal of the selected value of the third parameter. For example, the base station may transmit the third information indicating the third parameter to the terminal via higher layer signaling such as RRC or MAC CE or lower layer signaling such as DCI, and the third information may include the third parameter. Accordingly, the terminal may receive the third information indicating the third parameter from the base station via higher layer signaling such as RRC or MAC CE or lower layer signaling such as DCI, and obtain the third parameter according to the third information, thereby determining the value of the third parameter. In addition, the terminal may select one value from the value range of the fourth parameter, and take the selected value as the value of the fourth parameter. In addition, the terminal may report the selected value of the fourth parameter to the base station. For example, the terminal may take the value of the fourth parameter as a part of the PMI and feed back the PMI to the base station, thus realizing report of the value of the fourth parameter to the base station by the terminal. In addition, in this fourth example, although the base station informs the terminal of the selected value of the third parameter, since the value range of the fourth parameter may include multiple values of the fourth parameter, the terminal may still determine multiple subsets. The terminal may select a subset from the multiple subsets, and then select $M_v$ transform domain vectors in the selected subset.

In the first to fourth examples described above, a wireless communication standard specification (e.g., 3GPP standard specification) specifies the value range of the third parameter ($N_3'$). According to another example of the present disclosure, a wireless communication standard specification (e.g., 3GPP standard specification) may specify a value (e.g., a specific value) instead of a value range of the third parameter ($N_3'$). For example, a wireless communication standard specification (e.g., 3GPP standard specification) may specify that the value of the third parameter ($N_3'$) is an integer multiple of the value of the second parameter ($M_v$). For example, a wireless communication standard specification (e.g., 3GPP standard specification) may specify that the value of the third parameter ($N_3'$) is twice that of the second parameter ($M_v$), that is, $N_3'=2\ M_v$.

In the case that a wireless communication standard specification (e.g., 3GPP standard specification) specifies the value of the third parameter ($N_3'$), the terminal and the base station may determine the value of the third parameter according to the provision of the wireless communication standard specification. Therefore, the terminal does not need to report the value of the third parameter to the base station, or the base station does not need to inform the terminal of the value of the third parameter.

Similarly, in the first to fourth examples described above, a wireless communication standard specification (e.g., 3GPP standard specification) specifies the value range of the fourth parameter ($M_{initial}$). According to another example of the present disclosure, a wireless communication standard specification (e.g., 3GPP standard specification) may specify a value (e.g., a specific value) instead of a value range of the fourth parameter. In this case, the terminal and the base station may determine the value of the fourth parameter according to the provision of the wireless communication standard specification. Therefore, the terminal does not need to report the value of the fourth parameter to the base station, or the base station does not need to inform the terminal of the value of the fourth parameter.

After the terminal obtains the third parameter ($N_3'$) and the fourth parameter ($M_{initial}$), the terminal may perform step S203 according to the third parameter and the fourth parameter, that is, determine the number of transform domain vectors indicated by the second information from the number of candidate transform domain vectors indicated by the first information.

For example, first, the terminal may generate a subset (InS) of the candidate transform domain vectors from the number of candidate transform domain vectors indicated by the first information according to the third parameter and the fourth parameter. For example, the terminal may generate the subset (InS) of the candidate transform domain vectors according to the following Formula (2):

$$\text{InS}=\text{mod}(M_{initial}+n, M_{max}) \qquad \text{Formula (2)},$$

where $n=0,1,2,\ldots,(N_3'-1)$.

According to Formula (2), when the value of the fourth parameter ($M_{initial}$) is a specific value, one subset (InS) of the candidate transform domain vectors corresponding to this specific value will be generated. Therefore, when there are many possible values for the fourth parameter, multiple subsets (InS) of the candidate transform domain vectors may be generated accordingly. Similarly, when the value of the third parameter has multiple possible values and/or the value of the fourth parameter has multiple possible values, multiple subsets (InS) of the candidate transform domain vectors may be generated accordingly. Furthermore, the number of vectors included in each subset (InS) is equal to the value ($N_3'$) of the third parameter.

Furthermore, when the value of the third parameter ($N_3'$) is $M_{max}$, the subset determined according to Formula (2) is actually $M_{max}$ candidate transform domain vectors. In this case, only one subset includes $M_{max}$ candidate transform domain vectors.

Then, the terminal may determine the number of transform domain vectors indicated by the second information from the subset (InS). For example, the terminal may select $M_v$ transform domain vectors from the subset (InS). For example, indicators of some bits $$\left(\text{e.g., } \left\lceil \log_2 \binom{N_3'-1}{M_v-1} \right\rceil \text{ bits}\right)$$

bits) may be used to indicate the My transform domain vectors selected by the terminal from the subset (InS).

Figure 3A:
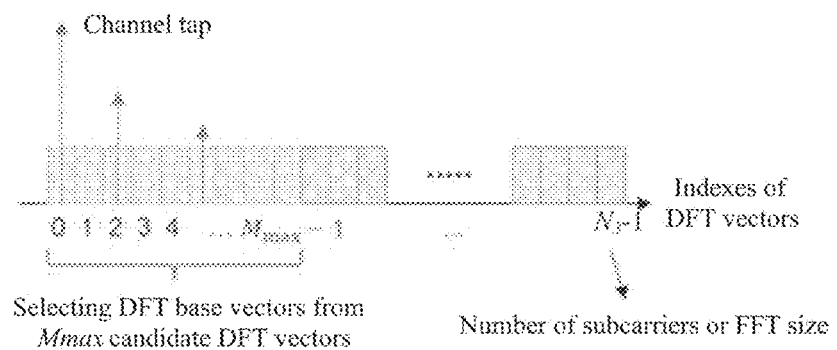
FIG. 3A is a schematic diagram of a terminal directly selecting transform domain vectors from candidate transform domain vectors according to an embodiment of the present disclosure.
Figure 3B:
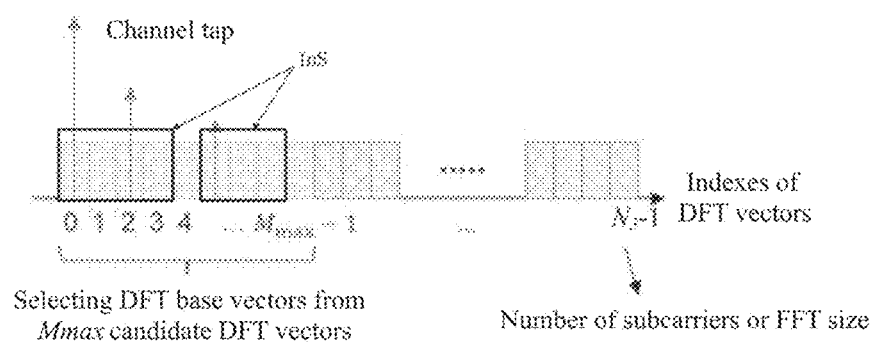
FIG. 3B is a schematic diagram of a terminal selecting transform domain vectors from a subset of the candidate transform domain vectors according to an embodiment of the present disclosure.

Next, with reference to FIG. 3A and FIG. 3B, a schematic diagram in which the terminal directly selects $M_v$ transform domain vectors from $M_{max}$ candidate transform domain vectors, as well as that the terminal selects $M_v$ transform domain vectors from a subset (InS) of the candidate transform domain vectors will be described again. FIG. 3A is a schematic diagram of a terminal directly selecting $M_v$ transform domain vectors from $M_{max}$ candidate transform domain vectors according to an embodiment of the present disclosure. FIG. 3B is a schematic diagram of a terminal selecting $M_v$ transform domain vectors from a subset (InS) of the candidate transform domain vectors according to an embodiment of the present disclosure.

In the example shown in FIG. 3A, the transform domain vectors are DFT vectors. As shown in FIG. 3A, the horizontal axis represents indexes of all DFT vectors corresponding to the number of subcarriers of the communication system or a size of Fast Fourier Transformation (FFT). Positions indicated by the arrows in the vertical direction may indicate positions of channel taps. The number of all DFT vectors corresponding to the number of subcarriers in the communication system is $N_3$, and their indexes are 0, 1, 2, . . . , ($N_3$−1), respectively. All DFT vectors corresponding to the number of subcarriers of the communication system include candidate DFT vectors used to determine the subcarrier-level precoding matrix. The number of candidate DFT vectors used to determine the subcarrier-level precoding matrix is $M_{max}$, and their indexes are 0, 1, 2, . . . , ($M_{max}$−1), respectively. The terminal selects $M_v$ DFT base vectors corresponding to the positions of the channel taps from the $M_{max}$ candidate DFT vectors. Indexes corresponding to the arrows in the vertical direction in FIG. 3A indicates indexes of the DFT base vectors selected by the terminal from the $M_{max}$ candidate DFT vectors.

In the example shown in FIG. 3B, the transform domain vectors are also DFT vectors. As shown in FIG. 3B, the horizontal axis represents indexes of all DFT vectors corresponding to the number of subcarriers of the communication system or the FFT size. Positions indicated by the arrows in the vertical direction may indicate positions of channel taps. The number of all DFT vectors corresponding to the number of subcarriers of the communication system is $N_3$, and their indexes are 0, 1, 2, . . . , ($N_3$−1), respectively. All DFT vectors corresponding to the number of subcarriers of the communication system include candidate DFT vectors used to determine the subcarrier-level precoding matrix. The number of candidate DFT vectors used to determine the subcarrier-level precoding matrix is $M_{max}$, and their indexes are 0, 1, 2, . . . , ($M_{max}$−1), respectively. The terminal determines a subset (InS) of the $M_{max}$ candidate DFT vectors, and selects $M_v$ DFT base vectors corresponding to the positions of the channel taps from the subset. Indexes corresponding to the arrows in the vertical direction in FIG. 3B indicates indexes of the DFT base vectors selected by the terminal from the subset.

Returning to FIG. 2, the method 200 may further include step S207. For example, step S207 may be performed after step S203. In step S207, the terminal may determine the precoding matrix indication information according to the transform domain vectors determined in step S203. That is, after the terminal selects the number of transform domain vectors indicated by the second information (i.e., selecting $M_v$ transform domain vectors), the terminal may determine the precoding matrix indication information according to the selected number of transform domain vectors indicated by the second information.

In the present disclosure, the precoding matrix indication information may be PMI. The terminal may generate PMI according to a conventional method of determining PMI according to transform domain base vectors (e.g., a method specified by a 3GPP standard specification). For example, the precoding matrix indication information may include indexes of $M_v$ transform domain vectors, or quantization information of the indexes of the $M_v$ transform domain vectors. Further, when the number $M_{max}$ of candidate transform domain vectors is a specific value, respective transform domain vectors may be indicated by using one or more bits corresponding to the specific value. For example, when the number $M_{max}$ of candidate transform domain vectors is 16, 4 bits may be used to indicate the respective transform domain vectors. For example, when the number $M_{max}$ of candidate transform domain vectors is 64, 6 bits may be used to indicate the respective transform domain vectors.

Furthermore, the method 200 may further include step S208 after step S202. In step S208, the terminal may transmit the precoding matrix indication information to the base station. In an example where the precoding matrix indication information is PMI, the terminal may contain PMI in a CSI report and transmit the CSI report to the base station, thus realizing feedback of PMI to the base station.

With the above-described method performed by a terminal according to the embodiment of the present disclosure, feedback overhead related to precoding from the terminal to the base station can be reduced under the condition of applying subcarrier-level precoding, thereby improving performance of the communication system.

Figure 4:
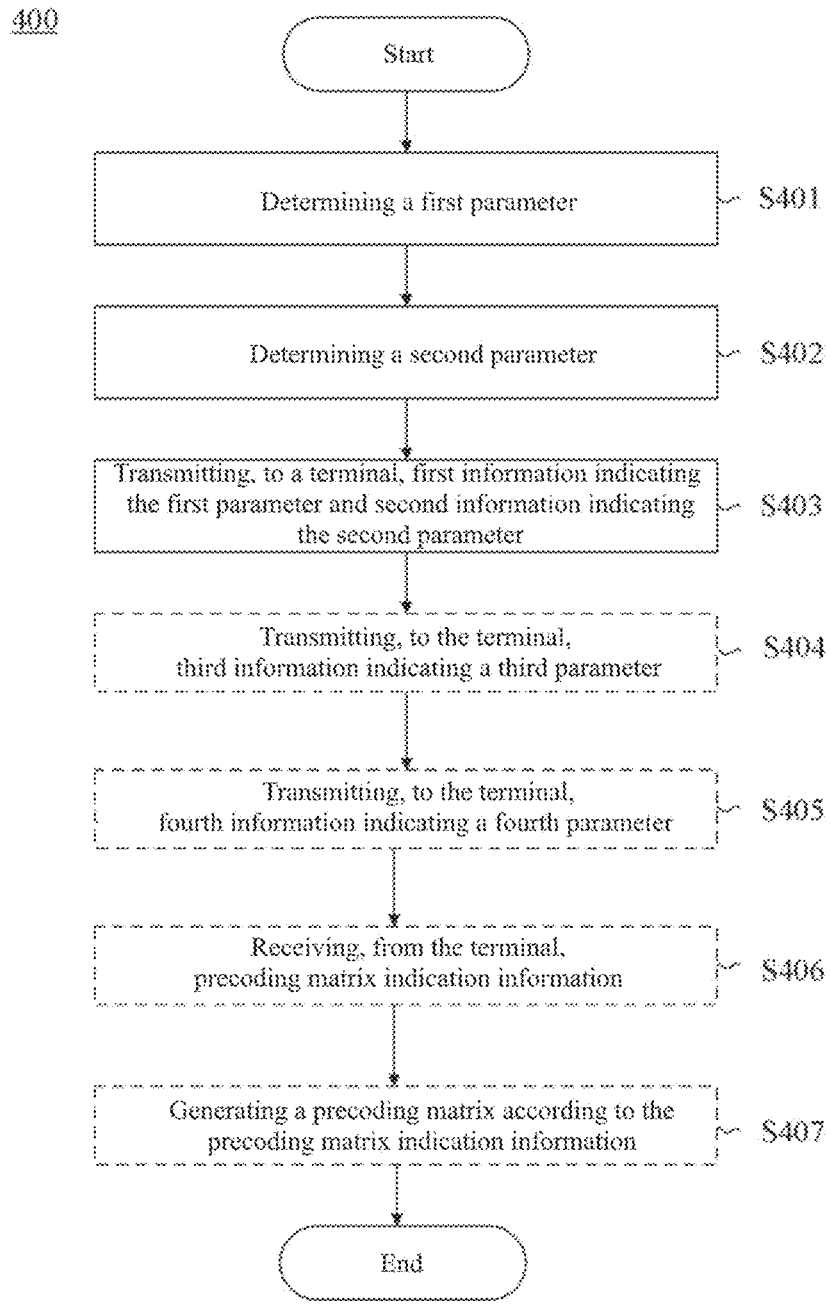
FIG. 4 shows a flowchart of a method performed by a base station according to an embodiment of the present disclosure.

Next, a method performed by a base station according to an embodiment of the present disclosure will be described with reference to FIG. 4. FIG. 4 shows a flowchart of a method performed by a base station according to an embodiment of the present disclosure. Since some details of the method 400 are the same as those of the method 200 described above with reference to FIG. 2, detailed description of the same content is omitted for simplicity.

As shown in FIG. 4, in step S401, the base station determines a first parameter, where the first parameter indicates a number of candidate transform domain vectors regarding a subcarrier-level precoding matrix, and a value of the first parameter is smaller than a number of subcarriers of a communication system. In step S402, the base station determines a second parameter, where the second parameter indicates a number of transform domain vectors used to determine the subcarrier-level precoding matrix. Thereafter, in step S403, the base station transmits first information indicating the first parameter and second information indicating the second parameter to a terminal in the communication system.

By introducing one new parameter, i.e., the first parameter, the number of candidate transform domain vectors regarding the subcarrier-level precoding matrix is reduced from the number ($N_3$) of subcarriers of the communication system to the value of the first parameter. Since the number of candidate transform domain vectors regarding the subcarrier-level precoding matrix is reduced, feedback overhead caused by selecting the transform domain vectors used to determine the subcarrier-level precoding matrix from the candidate transform domain vectors, and feeding back the selected transform domain vectors to the base station is reduced correspondingly.

In the present disclosure, when determining a value of the first parameter, the base station may use channel characteristics of multipath channels in the delay domain to achieve the technical effect of reducing feedback overhead. Specifically, multipath channels exhibit the following characteristics in the delay domain: an average channel power associated with a given multipath delay decreases with the increase of the delay, and the channel power is mainly concentrated in a range of small delay. For subcarrier-level precoding and/or CSI feedback, for example, eTDP precoding and/or CSI feedback mentioned above, the above channel characteristics may be utilized to reduce feedback overhead.

For example, in step S401, the base station may determine the value of the first parameter according to a delay spread of channels. For example, when the delay spread of channels is large, the base station may configure the value of the first parameter to be a large value; and, when the delay spread of channels is small, the base station may configure the value of the first parameter to be a small value. For example, when the delay spread of channels is greater than a first threshold, the base station may configure the value of the first parameter to be a large value (e.g., 64); and, when the delay spread of channels is less than or equal to the first threshold, the base station can configure the value of the first parameter as a small value (e.g., 16).

Furthermore, the candidate transform domain vectors in step S401 may be Discrete Fourier Transform (DFT) vectors.

Furthermore, the first parameter in step S401 may be represented as $M_{max}$, and its value is smaller than the number (i.e., $N_3$ mentioned above) of subcarriers of the communication system and larger than the number (e.g., which may be represented as $N_0$) of subbands of the communication system. Alternatively, the value of the first parameter in step S401 may be less than the number ($N_3$) of subcarriers of the communication system and less than or equal to the number ($N_0$) of subbands of the communication system.

Furthermore, in the present disclosure, the transform domain may be a domain resulted after transforming the frequency domain, such as a delay domain. The candidate transform domain vectors in step S401 may be Discrete Fourier transform (DFT) vectors.

Furthermore, according to an example of the present disclosure, in step S403, the first information indicating the first parameter may include the first parameter. For example, the first information may include only the first parameter, that is, the first information is the first parameter. As another example, the first information may include not only the first parameter, but also other information (e.g., other configuration information transmitted by the base station to the terminal).

Furthermore, according to an example of the present disclosure, in step S403, the first information indicating the first parameter can also be used to indicate a value range of the first parameter. In this example, the terminal may determine the value range of the first parameter according to the first information, select one value from the value range, and take the selected value as the value of the first parameter.

Furthermore, in step S403, the base station may transmit the first information to the terminal via higher layer signaling. In an example where the higher layer signaling is RRC signaling or MAC CE, the base station may transmit the first information to the terminal via RRC signaling or MAC CE. Accordingly, the terminal may receive the first information from the base station via RRC signaling or MAC CE.

Alternatively, in step S403, the base station may transmit the first information to the terminal via lower layer signaling. In an example where the lower layer signaling is DCI, the base station may transmit the first information to the terminal via DCI. Accordingly, the terminal may receive the first information from the base station via DCI.

In the present disclosure, the base station can not only inform the terminal of the number ($M_{max}$) of candidate transform domain vectors regarding the subcarrier-level precoding matrix, but also can inform the terminal of the number (i.e., the $M_v$ mentioned above) of transform domain vectors that the terminal should select from the candidate transform domain vectors, such that the terminal can determine the precoding matrix indication information. Therefore, in step S402, the base station determines the second parameter, where the second parameter indicates the number of transform domain vectors used to determine the subcarrier-level precoding matrix, and the value of the second parameter is smaller than that of the first parameter; and in step S403, the base station transmits the second information indicating the second parameter to the terminal. As described above, the second parameter may be represented as $M_v$ and is a positive integer, where v represents a rank corresponding to the terminal and is a positive integer.

According to an example of the present disclosure, the second information in step S403 may explicitly indicate the second parameter. For example, the second information may include the second parameter. In this example, the base station may transmit the second information to the terminal via higher layer signaling such as RRC or MAC CE. Accordingly, the terminal may receive the second information from the base station via higher layer signaling such as RRC or MAC CE, thereby obtaining the second parameter. Alternatively, the base station may transmit the second information to the terminal via lower layer signaling such as DCI. Accordingly, the terminal may receive the second information from the base station via lower layer signaling such as DCI, thereby obtaining the second parameter.

According to another example of the present disclosure, the second information in step S403 may implicitly indicate the second parameter. For example, the second information may be used to indicate a first factor corresponding to a value of the second parameter. The first factor may be represented as $p_v$, and the value of the first factor is greater than zero and less than one, that is, $0<p_v<1$. In this example, after the base station determines the number ($M_{max}$) of candidate transform domain vectors regarding the subcarrier-level precoding matrix and the number ($M_v$) of transform domain vectors that the terminal should select from the candidate transform domain vectors, the base station may determine the first factor ($p_v$) corresponding to the $M_v$ according to a preset rule. For example, the base station may determine the first factor ($p_v$) corresponding to the $M_v$ from a set of first factors (hereinafter referred to as the first set) according to the number ($M_{max}$) of candidate transform domain vectors regarding the subcarrier-level precoding matrix, the number ($M_v$) of transform domain vectors that the terminal should select from the candidate transform domain vectors, and the above Formula (1).

In this example, the base station may determine the first set according to at least a value of the rank corresponding to the terminal, the number of beams (e.g., spatial beams) and the first parameter, where the first set includes one or more first factors. Then, the base station may determine the first factor corresponding to the value of the second parameter from the first set according to the value of the first parameter (i.e., the number ($M_{max}$) of candidate transform domain vectors regarding the subcarrier-level precoding matrix) and the value of the second parameter (i.e., the number ($M_v$) of transform domain vectors that the terminal should select from the candidate transform domain vectors). Alternatively, the base station may determine the number ($M_{max}$) of candidate transform domain vectors regarding the subcarrier-level precoding matrix and the first factor ($p_v$), without determining the number ($M_v$) of transform domain vectors that the terminal should select from the candidate transform domain vectors. For example, the base station may determine one first factor ($p_v$) from the set of first factors and notify the terminal.

Furthermore, various factors may be considered when defining first factors in the first set. For example, the various factors may include the first parameter, namely the number (i.e., $M_{max}$ mentioned above) of candidate transform domain vectors, and/or the value (i.e., v mentioned above) of the rank, and/or the number (e.g., it may be represented as L) of beams, and so on. For example, in an example where the base station determines the first set according to the first parameter, when the value of the first parameter is greater than a second threshold, values of the first factors in the first set may be small (e.g., the first set may be {⅛, ¹⁄₁₆, ¹⁄₃₂}); when the value of the first parameter is less than the second threshold, values of the first factors in the first set may be large (e.g., the first set may be {½, ¼, ⅛}).

Furthermore, in this example, the base station may directly indicate a fifth parameter through the second information, and there is a correspondence between respective values of the fifth parameter and respective values of the first factor, so the base station may also indirectly indicate the first factor through the second information. Accordingly, the terminal may determine a value of the fifth parameter according to the second information, and determine the value of the first factor according to the determined value of the fifth parameter and the correspondence between respective values of the fifth parameter and respective values of the first factor.

The fifth parameter described herein may be paramCombination-rX specified in a wireless communication standard specification (e.g. 3GPP standard specification), where "rX" represents the release serial number of the communication system. For example, in the example where the release serial number of the communication system is NR Release 16 (R16), the fifth parameter may be paramCombination-r16.

According to an example of the present disclosure, the correspondence between respective values of the fifth parameter and respective values of the first factor may be set in advance for use by the base station and the terminal. Various factors may be considered when setting the correspondence between respective values of the fifth parameter and respective values of the first factor. For example, the various factors may include the number (i.e., $M_{max}$ mentioned above) of candidate transform domain vectors, and/or the value (i.e., v mentioned above) of the rank, and/or the number (i.e., L mentioned above) of beams, and so on. In addition, the fifth parameter may also indicate a value of a second factor, which may be used to limit the number of coefficients such as amplitude, phase and the like fed back by the terminal to the base station, so as to reduce feedback overhead. The second factor may be a factor specified by a wireless communication standard specification (e.g., 3GPP standard specification), for example, a factor β specified by NR Release 16 (R16). It should be recognized that in the case where the wireless communication system does not support the subcarrier-level precoding technology, when setting the correspondence between respective values of the fifth parameter and respective values of the first factor, the factors to be considered may include the value (i.e., v mentioned above) of the rank, and/or the number (e.g., it may be represented as L) of beams, and so on.

For example, when the number (i.e., $M_{max}$ mentioned above) of candidate transform domain vectors is large, and/or the value (i.e., v mentioned above) of the rank is large, the value of the first factor may be relatively small. When the number (i.e., $M_{max}$ mentioned above) of candidate transform domain vectors is small, and/or the value (i.e., v mentioned above) of rank is small, the value of the first factor may be relatively large.

Table 1 below is an example of the correspondence between respective values of the fifth parameter and respective values of the first factor, which are set in consideration of the value (i.e., v mentioned above) of the rank and the number (i.e., L mentioned above) of beams, where the fifth parameter may be paramCombination-r16. In addition, Table 1 may also be referred to as a codebook parameter configuration for the number (L) of beams, the second factor (β) and the first factor ($p_v$).

TABLE 1

Examples of the correspondence between respective values of the fifth parameter and respective values of the first factor

| | | $p_v$ | | |
| paramCombination-r16 | L | $v \in \{1, 2\}$ | $v \in \{3, 4\}$ | β |
| --- | --- | --- | --- | --- |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

Table 2 below is another example of the correspondence between respective values of the fifth parameter and respective values of the first factor, which are set in consideration of the number (i.e., $M_{max}$ mentioned above) of candidate transform domain vectors, the value (i.e., v mentioned above) of the rank and the number (i.e., L mentioned above) of beams, where the fifth parameter may be paramCombination-rX. In the example of Table 2, the value of the rank may be 1, 2, 3, or 4. In addition, Table 2 may also be referred to as a codebook parameter configuration for the number of beams (L), the second factor (β) and the first factor ($p_v$)) with a rank less than or equal to 4.

TABLE 2

Another example of the correspondence between respective values
of the fifth parameter and respective values of the first factor

| paramCombination-rX | L | $p_v$ | | | | β |
|---|---|---|---|---|---|---|
| | | $v \in \{1, 2\}$ $M_{max} < 32$ | $v \in \{1, 2\}$ $M_{max} \geq 32$ | $v \in \{3, 4\}$ $M_{max} < 32$ | $v \in \{3, 4\}$ $M_{max} \geq 32$ | |
| 1 | 2 | 1/4 | 1/8 | 1/8 | 1/16 | 1/4 |
| 2 | 2 | 1/4 | 1/8 | 1/8 | 1/16 | 1/2 |
| 3 | 4 | 1/4 | 1/8 | 1/8 | 1/16 | 1/4 |
| 4 | 4 | 1/4 | 1/8 | 1/8 | 1/16 | 1/2 |
| 5 | 4 | 1/4 | 1/8 | 1/8 | 1/16 | 3/4 |
| 6 | 4 | 1/2 | 1/4 | 1/4 | 1/8 | 1/2 |
| 7 | 6 | 1/4 | 1/8 | — | — | 1/2 |
| 8 | 6 | 1/4 | 1/8 | — | — | 3/4 |

Table 3 below is another example of the correspondence between respective values of the fifth parameter and respective values of the first factor, which are set in consideration of the number (i.e., $M_{max}$ mentioned above) of candidate transform domain vectors, the value (i.e., v mentioned above) of the rank and the number (i.e., L mentioned above) of beams, where the fifth parameter may be paramCombination-rX. In the example of Table 3, the value of the rank may be 1, 2, 3, 4, 5, or 6. In addition, Table 3 may also be referred to as a codebook parameter configuration for the number (L) of beams, the second factor (β) and the first factor ($p_v$) with a rank less than or equal to 6.

TABLE 3

Yet another example of the correspondence between respective values
of the fifth parameter and respective values of the first factor

| paramCombination-rX | L | $p_v$ | | | | | | β |
|---|---|---|---|---|---|---|---|---|
| | | $v \in \{1, 2\}$ $M_{max} < 32$ | $v \in \{1, 2\}$ $M_{max} \geq 32$ | $v \in \{3, 4\}$ $M_{max} < 32$ | $v \in \{3, 4\}$ $M_{max} \geq 32$ | $v \in \{5, 6\}$ $M_{max} < 32$ | $v \in \{5, 6\}$ $M_{max} \geq 32$ | |
| 1 | 2 | 1/4 | 1/8 | 1/8 | 1/16 | 1/16 | 1/32 | 1/4 |
| 2 | 2 | 1/4 | 1/8 | 1/8 | 1/16 | 1/16 | 1/32 | 1/2 |
| 3 | 4 | 1/4 | 1/8 | 1/8 | 1/16 | 1/16 | 1/32 | 1/4 |
| 4 | 4 | 1/4 | 1/8 | 1/8 | 1/16 | 1/16 | 1/32 | 1/2 |
| 5 | 4 | 1/4 | 1/8 | 1/8 | 1/16 | 1/16 | 1/32 | 3/4 |
| 6 | 4 | 1/2 | 1/4 | 1/4 | 1/8 | 1/8 | 1/16 | 1/2 |
| 7 | 6 | 1/4 | 1/8 | — | — | — | — | 1/2 |
| 8 | 6 | 1/4 | 1/8 | — | — | — | — | 3/4 |

In the present disclosure, when the value of the first parameter indicated by the first information is small, that is, the number ($M_{max}$) of candidate transform domain vectors of the subcarrier-level precoding matrix is small, the terminal may directly select $M_v$ transform domain vectors from the $M_{max}$ candidate transform domain vectors. When the value of the first parameter indicated by the first information is large, that is, the number ($M_{max}$) of candidate transform domain vectors regarding the subcarrier-level precoding matrix is large, the terminal may determine an Intermediate Subset (which may be abbreviated as InS or subset) of the candidate transform domain vectors, and select $M_v$ transform domain vectors from this subset to further reduce feedback overhead.

When the number (i.e., $M_{max}$ mentioned above) of candidate transform domain vectors is large and $M_v$ transform domain vectors are to be selected from the subset of the candidate transform domain vectors, the base station may determine the correspondence between values of the fifth parameter and values of the first factor by Table 1 described above. In addition, when the number (i.e., $M_{max}$ mentioned above) of candidate transform domain vectors is small and $M_v$ transform domain vectors are to be selected from $M_{max}$ candidate transform domain vectors, the base station may determine the correspondence between values of the fifth parameter and values of the first factor by Table 2 and Table 3 described above.

A schematic process of the base station and the terminal using the above table is given below. For example, if the value of the rank is 4 (i.e., v=4), the number of candidate transform domain vectors regarding the subcarrier-level precoding matrix is equal to 64 (i.e., $M_{max}$=64), and the number of transform domain vectors used to determine the subcarrier-level precoding matrix is equal to 8 (i.e., $M_v$=8), then the base station may determine that the first factor is equal to 1/8 (i.e., $p_v$=1) according to the above Formula (1) and the first set. According to Table 3 above, the base station may determine that the corresponding value of the fifth parameter is 6 (i.e., paramCombination-rX=6). Then, the base station may inform the terminal of the value of the fifth parameter. After learning that the value of the fifth parameter is 6, the terminal may determine the corresponding first factor (i.e., $p_v$=1/8) according to the value of the rank (i.e., v=4), the number (i.e., $M_{max}$=64) of candidate transform domain vectors regarding the subcarrier-level precoding matrix and the above Table 3. Then, the terminal may determine the number (i.e., $M_v$=8) of transform domain vectors used to determine the subcarrier-level precoding matrix according to the above Formula (1).

It should be recognized that step S402 may be performed after step S401, or may be performed before step S401, or may be performed simultaneously with step S401. FIG. 4 only shows a schematic diagram of step S402 performed after step S401, and does not show an example of performing step S402 before step S401 and an example of simultaneously performing step S401 and step S402.

Furthermore, as for the subset of the candidate transform domain vectors (InS) mentioned above, when determining the subset (InS) of the candidate transform domain vectors, the terminal further needs two parameters, namely the third parameter and the fourth parameter. The third parameter may be represented as $N_3'$, and its value may represent the number of vectors included in the subset (InS) of the candidate transform domain vectors (also referred to as a size of the subset). The number of vectors included in the subset (InS) of the candidate transform domain vectors is greater than the number ($M_v$) of transform domain vectors that the terminal should select from the candidate transform domain vectors, which may be 2 $M_v$, for example. That is, $N_3'$ may be equal to 2 $M_v$. In addition, the fourth parameter may be used to determine the vectors included in the subset of the candidate transform domain vectors, which may be represented as $M_{initial}$. A value range of the fourth parameter may be specified by a wireless communication standard specification (e.g., 3GPP standard specification). For example, the value range of the fourth parameter may be related to the third parameter, such as $M_{initial} \in \{-N_3'+1, -N_3'+2, \ldots, 0\}$.

The terminal and the base station may negotiate the value of the third parameter ($N_3'$) and the value of the fourth parameter ($M_{initial}$) in advance. According to a first example of the present disclosure, the terminal may determine the value of the third parameter and the value of the fourth parameter, and report the value of the third parameter and the value of the fourth parameter determined by itself to the base station. According to a second example of the present disclosure, the base station may determine the value of the third parameter and the value of the fourth parameter, and inform the terminal of the value of the third parameter and the value of the fourth parameter determined by itself. According to a third example of the present disclosure, the terminal may determine the value of the third parameter and report the value of the third parameter determined by itself to the base station, and the base station may determine the value of the fourth parameter and inform the terminal of the value of the fourth parameter determined by itself. According to a fourth example of the present disclosure, the base station may determine the value of the third parameter and inform the terminal of the value of the third parameter determined by itself, and the terminal may determine the value of the fourth parameter and report the value of the fourth parameter determined by itself to the base station.

In an example where the base station determines the value of the third parameter ($N_3'$) and the value of the fourth parameter ($M_{initial}$), a wireless communication standard specification (e.g., 3GPP standard specification) may specify the value range of the third parameter ($N_3'$). The base station may select one value from a value range of the third parameter, and take the selected value as the value of the third parameter. In addition, the base station may inform the terminal of the selected value of the third parameter. The base station may select one value from the range of the fourth parameter (Undid), and take the selected value as the value of the fourth parameter. In addition, the base station may inform the terminal of the selected value of the fourth parameter.

For example, the base station may include third information indicating the third parameter ($N_3'$) and fourth information indicating the fourth parameter ($M_{initial}$) in one piece of indication information and transmit the piece of indication information to the terminal. For example, the base station may transmit indication information indicating a subset of the candidate transform domain vectors to the terminal, such that the terminal may determine the number of transform domain vectors indicated by the second information from the subset. The indication information may include the third information indicating the third parameter ($N_3'$) and the fourth information indicating the fourth parameter ($M_{initial}$).

As another example, the base station may transmit the third information indicating the third parameter ($N_3'$) and the fourth information indicating the fourth parameter ($M_{initial}$) to the terminal, respectively.

Specifically, the base station may transmit third information indicating the third parameter ($N_3'$) to the terminal (e.g., step S404 in FIG. 4). The third information may include the third parameter. Accordingly, the terminal may receive the third information indicating the third parameter from the base station, and obtain the third parameter according to the third information, so as to obtain the value of the third parameter. For example, the base station may transmit the third information to the terminal via higher layer signaling such as RRC or MAC CE. Accordingly, the terminal may receive the third information from the base station via higher layer signaling such as RRC or MAC CE, thereby obtaining the third parameter and determining the value of the third parameter. Alternatively, the base station may transmit the third information to the terminal via lower layer signaling such as DCI. Accordingly, the terminal may receive the third information from the base station via lower layer signaling such as DCI, thereby obtaining the third parameter and determining the value of the third parameter.

The base station may select one value from a value range of the fourth parameter ($M_{initial}$), and take the selected value as the value of the fourth parameter. In addition, the base station may inform the terminal of the selected value of the fourth parameter.

For example, the base station may transmit the fourth information indicating the fourth parameter to the terminal (e.g., step S405 in FIG. 4). The fourth information may include the fourth parameter. Accordingly, the terminal may receive the fourth information indicating the fourth parameter from the base station, and obtain the fourth parameter according to the fourth information, so as to determine the value of the fourth parameter. For example, the base station may transmit the fourth information to the terminal via higher layer signaling such as RRC or MAC CE. Accordingly, the terminal may receive the fourth information from the base station via higher layer signaling such as RRC or MAC CE, thereby obtaining the fourth parameter and determining the value of the fourth parameter. Alternatively, the base station may transmit the fourth information to the terminal via lower layer signaling such as DCI. Accordingly, the terminal may receive the fourth information from the base station via lower layer signaling such as DCI, thereby obtaining the fourth parameter and determining the value of the fourth parameter.

With continued reference to FIG. 4, after step S405, the method 400 may further include steps S406 and S407. In step S406, the base station may receive precoding matrix indication information from the terminal. Then, in step S407, the base station may generate a precoding matrix according to the precoding matrix indication information. In the present disclosure, the precoding matrix indication information may be PMI. The base station may generate the precoding matrix according to a conventional method of generating a precoding matrix through PMI (e.g., a method specified in a 3GPP standard specification).

Furthermore, in the present disclosure, the precoding matrix indication information may be subcarrier-level precoding matrix indication information (e.g., a subcarrier-level PMI) instead of subband-level precoding matrix indication information (e.g., a subband-level PMI). Furthermore, the "candidate transform domain vectors regarding the subcarrier-level precoding matrix" described above may be candidate transform domain vectors regarding a subcarrier-level precoding matrix indication information (e.g., a subcarrier-level PMI). The "transform domain vectors used to determine subcarrier-level precoding matrix" described above may be transform domain vectors used to determine subcarrier-level precoding matrix indication information (e.g., a subcarrier-level PMI).

With the above-described method performed by a base station in the embodiment of the present disclosure, feedback overhead related to precoding from the terminal to the base station can be reduced under the condition of applying subcarrier-level precoding, thereby improving performance of the communication system.

Figure 5:
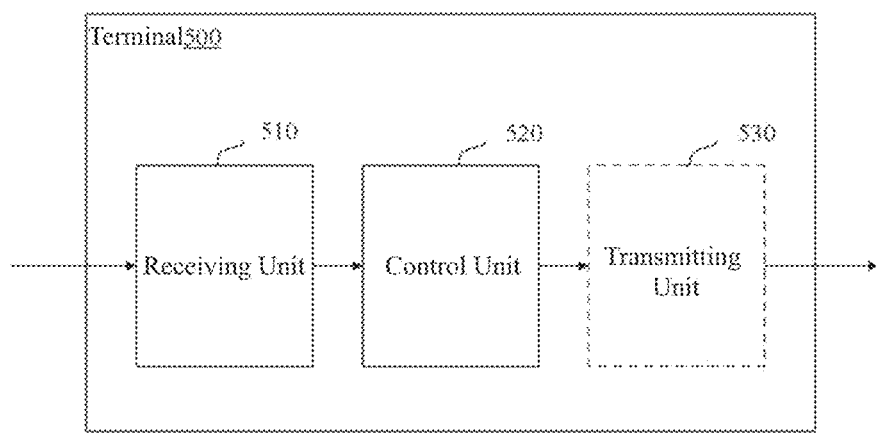
FIG. 5 shows a structural schematic diagram of a terminal according to an embodiment of the present disclosure.

Next, a terminal according to an embodiment of the present disclosure will be described with reference to FIG. 5. FIG. 5 is a schematic structural diagram of a terminal 500 according to an embodiment of the present disclosure. Since functions of the terminal 500 are the same as some details of the method 200 described above with reference to FIG. 2, detailed description of the same content is omitted for the sake of simplicity. As shown in FIG. 5, the terminal 500 includes: a receiving unit 510 configured to receive, from a base station in the communication system, first information indicating a first parameter, where the first parameter indicates a number of candidate transform domain vectors regarding a subcarrier-level precoding matrix, and a value of the first parameter is smaller than a number of subcarriers in the communication system; the receiving unit 510 being further configured to receive from the base station, second information indicating a second parameter, where the second parameter indicates a number of transform domain vectors used to determine the subcarrier-level precoding matrix; and a control unit 520 configured to determine, from the number of candidate transform domain vectors indicated by the first information, the number of transform domain vectors indicated by the second information. In addition to these two units, the terminal 500 may further include other components, however, since these components are irrelevant to the contents of the embodiment of the present disclosure, illustration and description thereof are omitted herein.

According to an example of the present disclosure, the base station may transmit the first information to the terminal via higher layer signaling. In an example where the higher layer signaling is Radio Resource Control (RRC) signaling or Media Access Control (MAC) Control Element (CE), the base station may transmit the first information to the terminal via RRC signaling or MAC CE. Accordingly, the receiving unit 510 may receive the first information from the base station via RRC signaling or MAC CE.

Furthermore, the base station may transmit the first information to the terminal via lower layer signaling. In an example where the lower layer signaling is Downlink Control Information (DCI), the base station may transmit the first information to the terminal via DCI. Accordingly, the receiving unit 510 may receive the first information from the base station via DCI.

In the present disclosure, the base station can not only inform the terminal of the number ($M_{max}$) of candidate transform domain vectors regarding the subcarrier-level precoding matrix, but also can inform the terminal of the number of transform domain vectors that the terminal should select from the candidate transform domain vectors, such that the terminal can determine precoding matrix indication information. Therefore, the receiving unit 510 receives second information indicating a second parameter from the base station, where the second parameter indicates a number of transform domain vectors used to determine the subcarrier-level precoding matrix, and a value of the second parameter is smaller than that of the first parameter. The second parameter may be represented as $M_v$ and is a positive integer, where v represents a rank corresponding to the terminal and is a positive integer.

Furthermore, according to an example of the present disclosure, the second information may explicitly indicate the second parameter. For example, the second information may include the second parameter. In this example, the base station may transmit the second information to the terminal via higher layer signaling such as RRC or MAC CE. Accordingly, the receiving unit 510 may receive the second information from the base station via higher layer signaling such as RRC or MAC CE, thereby obtaining the second parameter. Alternatively, the base station may transmit the second information to the terminal via lower layer signaling such as DCI. Accordingly, the receiving unit 510 may receive the second information from the base station via lower layer signaling such as DCI, thereby obtaining the second parameter.

According to another example of the present disclosure, the second information may implicitly indicate the second parameter. For example, the second information may be used to indicate a first factor corresponding to a value of the second parameter. The first factor may be represented as $p_v$, whose value is greater than zero and less than one, that is, $0<p_v<1$. In this example, after the base station determines the number ($M_{max}$) of candidate transform domain vectors regarding the subcarrier-level precoding matrix and the number ($M_v$) of transform domain vectors that the terminal should select from the candidate transform domain vectors, the base station may determine the first factor ($p_v$) corresponding to the $M_v$ according to a preset rule. For example, the base station may determine the first factor ($p_v$) corresponding to the $M_v$ from a set of first factors according to the number ($M_{max}$) of candidate transform domain vectors regarding the subcarrier-level precoding matrix, the number ($M_v$) of transform domain vectors that the terminal should select from the candidate transform domain vectors, and the above Formula (1).

Furthermore, when determining the precoding matrix, in addition to the transform domain vectors, multiple spatial vectors (also referred to as spatial beams, or spatial codewords, or wideband codewords, or wideband spatial codewords, etc.) are needed, such as L spatial vectors, where L is a positive integer. Each spatial vector has a frequency domain weighting coefficient. The transform domain vectors in the present disclosure may be used to transform and compress frequency domain weighting coefficients of the spatial domain vectors (e.g., transform them to the delay domain first, and then compress in the delay domain). However, since the spatial vectors are not related to the technical solution of the present disclosure, description related to the spatial vectors is omitted in the present disclosure.

Furthermore, the control unit 520 may determine the value of the second parameter according to the first factor and the first parameter. Specifically, the control unit 520 may determine the value of the second parameter according to a value of the first factor and the value of the first parameter. For example, the control unit 520 may determine the value of the second parameter through the above-described Formula (1).

Furthermore, the control unit 520 may determine the precoding matrix indication information according to at least the first information and the second information. For example, the control unit 520 may determine the precoding matrix indication information according to at least the first parameter indicated by the first information and the second parameter indicated by the second information.

Alternatively, the control unit 520 may select the number of transform domain vectors indicated by the second information from the number of candidate transform domain vectors indicated by the first information, such that the control unit 520 may determine the precoding matrix indication information according to at least the selected transform domain vectors. That is, the control unit 520 can select $M_v$ transform domain vectors from $M_{max}$ candidate transform domain vectors regarding the subcarrier-level precoding matrix, and determine the precoding matrix indication information according to at least the selected My transform domain vectors.

When the value of the first parameter indicated by the first information is small, that is, the number ($M_{max}$) of candidate transform domain vectors regarding the subcarrier-level precoding matrix is small, the terminal may directly select $M_v$ transform domain vectors from the $M_{max}$ candidate transform domain vectors. When the value of the first parameter indicated by the first information is large, that is, the number ($M_{max}$) of candidate transform domain vectors regarding the subcarrier-level precoding matrix is large, the control unit 520 may determine an Intermediate Subset (which may be abbreviated as InS or subset) of the candidate transform domain vectors, and select $M_v$ transform domain vectors from this subset to further reduce feedback overhead. For example, the receiving unit 510 may receive indication information indicating the subset of the candidate transform domain vectors from the base station, and the control unit 520 may determine the number of transform domain vectors indicated by the second information from the subset (i.e., selecting $M_v$ transform domain vectors from the subset).

According to an example of the present disclosure, when determining the subset (InS) of the candidate transform domain vectors, the control unit 520 further needs two parameters, namely a third parameter and a fourth parameter. The third parameter may be represented as $N_3'$, and its value may represent the number of vectors included in the subset (InS) of the candidate transform domain vectors (also referred to as a size of the subset). The number of vectors included in the subset (InS) of the candidate transform domain vectors is greater than the number ($M_v$) of transform domain vectors that the terminal should select from the candidate transform domain vectors, which may be $2 M_v$, for example. That is, $N_3'$ may be equal to $2 M_v$. In addition, the fourth parameter may be used to determine the vectors included in the subset of the candidate transform domain vectors, which may be represented as $M_{initial}$. A value range of the fourth parameter may be specified by a wireless communication standard specification (e.g., 3GPP standard specification). For example, the value range of the fourth parameter may be related to the third parameter, such as $M_{initial} \in \{-N_3'1, -N_3'+2, \ldots, 0\}$.

The terminal and the base station may negotiate the value of the third parameter ($N_3'$) and the value of the fourth parameter ($M_{initial}$) in advance. According to a first example of the present disclosure, the terminal may determine the value of the third parameter and the value of the fourth parameter, and report the value of the third parameter and the value of the fourth parameter determined by itself to the base station. According to a second example of the present disclosure, the base station may determine the value of the third parameter and the value of the fourth parameter, and inform the terminal of the value of the third parameter and the value of the fourth parameter determined by itself. According to a third example of the present disclosure, the terminal may determine the value of the third parameter and report the value of the third parameter determined by itself to the base station, and the base station may determine the value of the fourth parameter and inform the terminal of the value of the fourth parameter determined by itself. According to a fourth example of the present disclosure, the base station may determine the value of the third parameter and inform the terminal of the value of the third parameter determined by itself, and the terminal may determine the value of the fourth parameter and report the value of the fourth parameter determined by itself to the base station. In these examples, the terminal may further include a transmitting unit 530.

In the first example where the terminal determines the value of the third parameter ($N_3'$) and the value of the fourth parameter ($M_{initial}$), a wireless communication standard specification (e.g., 3GPP standard specification) may specify a value range of the third parameter. The control unit 520 of the terminal may select one value from the value range of the third parameter, and take the selected value as the value of the third parameter. In addition, the transmitting unit 530 of the terminal may report the selected value of the third parameter to the base station. For example, the transmitting unit 530 of the terminal may take the value of the third parameter as a part of the PMI and feed back the PMI to the base station, thus realizing report of the value of the third parameter to the base station by the terminal. In addition, the control unit 520 of the terminal may select one value from a value range of the fourth parameter, and take the selected value as the value of the fourth parameter. In addition, the transmitting unit 530 of the terminal may report the selected value of the fourth parameter to the base station. For example, the transmitting unit 530 of the terminal may take the value of the fourth parameter as a part of the PMI and feed back the PMI to the base station, thus realizing report of the value of the fourth parameter to the base station by the terminal.

Furthermore, in the second example where the base station determines the value of the third parameter ($N_3'$) and the value of the fourth parameter ($M_{initial}$), a wireless communication standard specification (e.g., 3GPP standard specification) may specify the value range of the third parameter ($N_3'$). The base station may select one value from the value range of the third parameter, and take the selected value as the value of the third parameter. The base station may inform the terminal of the selected value of the third parameter. In addition, the base station may select one value from the value range of the fourth parameter ($M_{initial}$), and take the selected value as the value of the fourth parameter. The base station may inform the terminal of the selected value of the fourth parameter.

For example, the base station may include third information indicating the third parameter ($N_3'$) and fourth information indicating the fourth parameter ($M_{initial}$) in one piece of indication information and transmit the piece of indication information to the terminal. For example, the base station may transmit indication information indicating a subset of the candidate transform domain vectors to the terminal, such that the terminal may determine the number of transform domain vectors indicated by the second information from the subset. The indication information may include the third information indicating the third parameter ($N_3'$) and the fourth information indicating the fourth parameter ($M_{initial}$). The third information may include the third parameter. The fourth information may include the fourth parameter. Accordingly, the receiving unit 510 may receive the indication information indicating the subset of the candidate transform domain vectors from the base station, and determine the number of transform domain vectors indicated by the second information from the subset.

As another example, the base station may transmit the third information indicating the third parameter ($N_3'$) and the fourth information indicating the fourth parameter ($M_{initial}$) to the terminal, respectively.

Specifically, the base station may transmit the third information indicating the third parameter ($N_3'$) to the terminal. The third information may include the third parameter. Accordingly, the receiving unit 510 may receive the third information indicating the third parameter from the base station, and obtain the third parameter according to the third information, so as to determine the value of the third parameter.

Furthermore, the base station may transmit the fourth information indicating the fourth parameter ($M_{initial}$) to the terminal. The fourth information may include the fourth parameter. Accordingly, the receiving unit 510 may receive the fourth information indicating the fourth parameter from the base station, and obtain the fourth parameter according to the fourth information, so as to determine the value of the fourth parameter.

Furthermore, in the third example where the terminal determines the value of the third parameter ($N_3'$) and the base station determines the value of the fourth parameter ($M_{initial}$) a wireless communication standard specification (e.g., 3GPP standard specification) may specify the value range of the third parameter ($N_3'$). The control unit 520 of the terminal may select one value from the value range of the third parameter, and take the selected value as the value of the third parameter. In addition, the transmitting unit 530 of the terminal may report the selected value of the third parameter to the base station. For example, the transmitting unit 530 of the terminal may take the value of the third parameter as a part of the PMI and feed back the PMI to the base station, thus realizing report of the value of the third parameter to the base station by the terminal. In addition, the base station may select one value from the value range of the fourth parameter ($M_{initial}$), and take the selected value as the value of the fourth parameter. The base station may inform the terminal of the selected value of the fourth parameter. For example, the base station may transmit the fourth information indicating the fourth parameter to the terminal via higher layer signaling such as RRC or MAC CE or lower layer signaling such as DCI, and the fourth information may include the fourth parameter. Accordingly, the receiving unit 510 of the terminal may receive the fourth information indicating the fourth parameter from the base station via higher layer signaling such as RRC or MAC CE or lower layer signaling such as DCI, and obtain the fourth parameter according to the fourth information, thereby determining the value of the fourth parameter.

Furthermore, in the fourth example where the base station determines the value of the third parameter ($N_3'$) and the terminal determines the value of the fourth parameter ($M_{initial}$), a wireless communication standard specification (e.g., 3GPP standard specification) may specify the value range of the third parameter ($N_3'$). The base station may select one value from the value range of the third parameter, and take the selected value as the value of the third parameter. The base station may inform the terminal of the selected value of the third parameter. For example, the base station may transmit the third information indicating the third parameter to the terminal via higher layer signaling such as RRC or MAC CE or lower layer signaling such as DCI, and the third information may include the third parameter. Accordingly, the receiving unit 510 of the terminal may receive the third information indicating the third parameter from the base station via higher layer signaling such as RRC or MAC CE or lower layer signaling such as DCI, and obtain the third parameter according to the third information, thereby determining the value of the third parameter. In addition, the control unit 520 of the terminal may select one value from the value range of the fourth parameter, and take the selected value as the value of the fourth parameter. In addition, the transmitting unit 530 of the terminal may report the selected value of the fourth parameter to the base station. For example, the transmitting unit 530 of the terminal may take the value of the fourth parameter as a part of the PMI and feed back the PMI to the base station, thus realizing report of the value of the fourth parameter to the base station by the terminal.

After the control unit 520 obtains the third parameter ($N_3'$) and the fourth parameter ($M_{initial}$), the control unit 520 may determine the number of transform domain vectors indicated by the second information from the number of candidate transform domain vectors indicated by the first information according to the third parameter and the fourth parameter.

For example, first, the control unit 520 may generate a subset (InS) of the candidate transform domain vectors from the number of candidate transform domain vectors indicated by the first information according to the third parameter and the fourth parameter. For example, the terminal may generate the subset (InS) of the candidate transform domain vectors according to the above Formula (2). Then, the control unit 520 may determine the number of transform domain vectors indicated by the second information from the subset (InS). For example, the terminal may select $M_v$ transform domain vectors from the subset (InS).

Furthermore, the control unit 520 may determine the precoding matrix indication information according to the determined transform domain vectors. That is, after the terminal selects the number of transform domain vectors indicated by the second information (i.e., selecting $M_v$ transform domain vectors), the terminal may determine the precoding matrix indication information according to the selected number of transform domain vectors indicated by the second information.

In the present disclosure, the precoding matrix indication information may be PMI. The terminal may generate PMI according to a conventional method of determining PMI based on transform domain base vectors (e.g., a method specified by a 3GPP standard specification). For example, the precoding matrix indication information may include indexes of $M_v$ transform domain vectors, or quantization information of the indexes of the $M_v$ transform domain vectors.

Furthermore, the transmitting unit 530 may transmit the precoding matrix indication information to the base station. In an example where the precoding matrix indication information is PMI, the terminal may include the PMI in a CSI report and transmit the CSI report to the base station, thus realizing feedback of PMI to the base station.

With the above-described terminal of the embodiment of the present disclosure, feedback overhead related to precoding from the terminal to the base station can be reduced under the condition of applying subcarrier-level precoding, thereby improving performance of the communication system.

Figure 6:
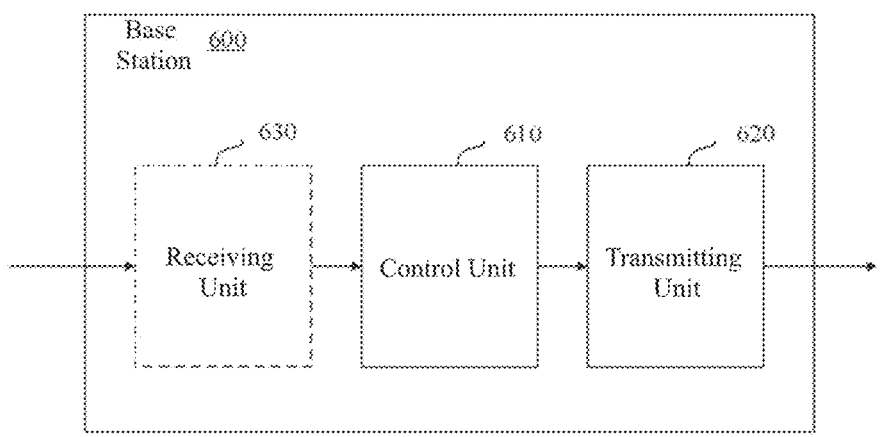
FIG. 6 shows a structural schematic diagram of a base station according to an embodiment of the present disclosure.

Next, a base station according to an embodiment of the present disclosure will be described with reference to FIG. 6. FIG. 6 is a schematic structural diagram of a base station 600 according to an embodiment of the present disclosure. Since functions of the base station 600 are the same as some details of the method 400 described above with reference to FIG. 4, detailed description of the same content is omitted for the sake of simplicity. As shown in FIG. 6, the base station 600 includes: a control unit 610 configured to determine a first parameter, where the first parameter indicates a number of candidate transform domain vectors for a subcarrier-level precoding matrix, and a value of the first parameter is smaller than a number of subcarriers of a communication system; the control unit 610 being further configured to determine a second parameter, where the second parameter indicates a number of transform domain vectors used to determine the subcarrier-level precoding matrix; and a transmitting unit 620 configured to transmit, to a terminal in the communication system, first information indicating the first parameter and second information indicating the second parameter. In addition to these two units, the base station 600 may further include other components, however, since these components are irrelevant to the contents of the embodiment of the present disclosure, illustration and description thereof are omitted herein.

In the present disclosure, when determining the value of the first parameter, the base station may use channel characteristics of multipath channels in the delay domain to achieve the technical effect of reducing feedback overhead. Specifically, the multipath channel exhibits the following characteristics in the delay domain: an average channel power associated with a given multipath delay decreases with the increase of the delay, and the channel power is mainly concentrated in a range of small delay. For subcarrier-level precoding and/or CSI feedback, for example, eTDP precoding and/or CSI feedback mentioned above, the above channel characteristics may be utilized to reduce feedback overhead.

For example, the control unit 610 may determine the value of the first parameter according to a delay spread of channels. For example, when the delay spread of channels is large, the control unit 610 may configure the value of the first parameter to be a large value; moreover, when the delay spread of channels is small, the control unit 610 may configure the value of the first parameter to be a small value.

Furthermore, the transmitting unit 620 may transmit the first information to the terminal via higher layer signaling. In an example where the higher layer signaling is RRC signaling or MAC CE, the transmitting unit 620 may transmit the first information to the terminal via RRC signaling or MAC CE. Accordingly, the terminal may receive the first information from the base station via RRC signaling or MAC CE. Alternatively, the transmitting unit 620 may transmit the first information to the terminal via lower layer signaling. In an example where the lower layer signaling is DCI, the transmitting unit 620 may transmit the first information to the terminal via DCI. Accordingly, the terminal may receive the first information from the base station via DCI.

In the present disclosure, the base station can not only inform the terminal of the number ($M_{max}$) of candidate transform domain vectors regarding the subcarrier-level precoding matrix, but also can inform the terminal of the number (i.e., the $M_v$ mentioned above) of transform domain vectors that the terminal should select from the candidate transform domain vectors, such that the terminal can determine precoding matrix indication information. Therefore, the control unit 610 determines the second parameter, where the second parameter indicates the number of transform domain vectors used to determine the subcarrier-level precoding matrix, and the value of the second parameter is smaller than that of the first parameter; and the transmitting unit 620 transmits the second information indicating the second parameter to the terminal. As described above, the second parameter may be represented as $M_v$ and is a positive integer, where v represents a rank corresponding to the terminal and is a positive integer.

According to an example of the present disclosure, the second information may explicitly indicate the second parameter. For example, the second information may include the second parameter. In this example, the transmitting unit 620 may transmit the second information to the terminal via higher layer signaling such as RRC or MAC CE. Accordingly, the terminal may receive the second information from the base station via higher layer signaling such as RRC or MAC CE, thereby obtaining the second parameter. Alternatively, the transmitting unit 620 may transmit the second information to the terminal via lower layer signaling such as DCI. Accordingly, the terminal may receive the second information from the base station via lower layer signaling such as DCI, thereby obtaining the second parameter.

According to another example of the present disclosure, the second information may implicitly indicate the second parameter. For example, the second information may be used to indicate a first factor corresponding to the value of the second parameter. The first factor may be represented as $p_v$, whose value is greater than zero and less than one, that is, $0<p_v<1$. In this example, after the control unit 610 determines the number of candidate transform domain vectors ($M_{max}$) regarding the subcarrier-level precoding matrix and the number of transform domain vectors ($M_v$) that the terminal should select from the candidate transform domain vectors, the control unit 610 may determine the first factor ($p_v$) corresponding to the $M_v$ according to a preset rule. For example, the control unit 610 may determine the first factor ($p_v$) corresponding to the $M_v$ from a set of first factors (hereinafter referred to as the first set) according to the number ($M_{max}$) of candidate transform domain vectors regarding the subcarrier-level precoding matrix, the number ($M_v$) of transform domain vectors that the terminal should select from the candidate transform domain vectors, and the above Formula (1).

In this example, the control unit 610 may determine the first set according to at least the value of the rank corresponding to the terminal, the number of beams (e.g., spatial beams) and the first parameter, where the first set includes one or more first factors. Thereafter, the control unit 610 may determine the first factor corresponding to the value of the second parameter from the first set according to the value of the first parameter (i.e., the number ($M_{max}$) of candidate transform domain vectors regarding the subcarrier-level precoding matrix) and the value of the second parameter (i.e., the number ($M_v$) of transform domain vectors that the terminal should select from the candidate transform domain vectors).

Furthermore, various factors may be considered when defining the first factor in the first set. For example, the various factors may include the first parameter, namely the number (i.e., $M_{max}$ mentioned above) of candidate transform domain vectors, and/or the value (i.e., v mentioned above) of the rank, and/or the number (e.g., it may be represented as L) of beams, and so on.

Furthermore, in this example, the control unit 610 may directly indicate a fifth parameter through the second information, and there is a correspondence between respective values of the fifth parameter and respective values of the first factor, so the control unit 610 may also indirectly indicate the first factor through the second information. Accordingly, the terminal may determine a value of the fifth parameter according to the second information, and determine the value of the first factor according to the determined value of the fifth parameter and the correspondence between respective values of the fifth parameter and respective values of the first factor.

In the present disclosure, when the value of the first parameter indicated by the first information is small, that is, the number ($M_{max}$) of candidate transform domain vectors of the subcarrier-level precoding matrix is small, the terminal may directly select $M_v$ transform domain vectors from the $M_{max}$ candidate transform domain vectors. When the value of the first parameter indicated by the first information is large, that is, the number ($M_{max}$) of candidate transform domain vectors regarding the subcarrier-level precoding matrix is large, the terminal may determine an Intermediate Subset (which may be abbreviated as InS or subset) of the candidate transform domain vectors, and select $M_v$ transform domain vectors from this subset to further reduce feedback overhead.

When the number (i.e., $M_{max}$ mentioned above) of candidate transform domain vectors is large and $M_v$ transform domain vectors are to be selected from the subset of the candidate transform domain vectors, the control unit 610 may determine the correspondence between values of the fifth parameter and values of the first factor through Table 1 described above. Furthermore, when the number (i.e., $M_{max}$ mentioned above) of candidate transform domain vectors is small and $M_v$ transform domain vectors are to be selected from $M_{max}$ candidate transform domain vectors, the control unit 610 may determine the correspondence between values of the fifth parameter and values of the first factor through Table 2 and Table 3 described above.

Furthermore, for the subset (InS) of the candidate transform domain vectors mentioned above, when determining the subset (InS) of the candidate transform domain vectors, the terminal further needs two parameters, namely the third parameter and the fourth parameter.

The terminal and the base station may negotiate the value of the third parameter ($N_3'$) and the value of the fourth parameter ($M_{initial}$) in advance. According to a first example of the present disclosure, the terminal may determine the value of the third parameter and the value of the fourth parameter, and report the value of the third parameter and the value of the fourth parameter determined by itself to the base station. According to a second example of the present disclosure, the base station may determine the value of the third parameter and the value of the fourth parameter, and inform the terminal of the value of the third parameter and the value of the fourth parameter determined by itself. According to a third example of the present disclosure, the terminal may determine the value of the third parameter and report the value of the third parameter determined by itself to the base station, and the base station may determine the value of the fourth parameter and inform the terminal of the value of the fourth parameter determined by itself. According to a fourth example of the present disclosure, the base station may determine the value of the third parameter and inform the terminal of the value of the third parameter determined by itself, and the terminal may determine the value of the fourth parameter and report the value of the fourth parameter determined by itself to the base station.

In the example where the base station determines the value of the third parameter ($N_3'$) and the value of the fourth parameter ($M_{initial}$), a wireless communication standard specification (e.g., 3GPP standard specification) may specify a value range of the third parameter ($N_3'$). The control unit 610 may select one value from the value range of the third parameter, and take the selected value as the value of the third parameter. In addition, the transmitting unit 620 may inform the terminal of the selected value of the third parameter. The control unit 610 may select one value from the value range of the fourth parameter, and take the selected value as the value of the fourth parameter. In addition, the transmitting unit 620 may inform the terminal of the selected value of the fourth parameter.

For example, the transmitting unit 620 may include third information indicating the third parameter ($N_3'$) and fourth information indicating the fourth parameter ($M_{initial}$) in one piece of indication information, and transmit the piece of indication information to the terminal. For example, the transmitting unit 620 may transmit indication information indicating a subset of the candidate transform domain vectors to the terminal, such that the terminal can determine the number of transform domain vectors indicated by the second information from the subset. The indication information may include the third information indicating the third parameter ($N_3'$) and the fourth information indicating the fourth parameter ($M_{initial}$).

As another example, the transmitting unit 620 may transmit the third information indicating the third parameter ($N_3'$) and the fourth information indicating the fourth parameter ($M_{initial}$) to the terminal, respectively.

Specifically, the transmitting unit 620 may transmit the third information indicating the third parameter ($N_3'$) to the terminal. The third information may include the third parameter. Accordingly, the terminal may receive the third information indicating the third parameter from the base station, and obtain the third parameter according to the third information, so as to determine the value of the third parameter. In addition, the transmitting unit 620 may transmit fourth information indicating the fourth parameter to the terminal. The fourth information may include the fourth parameter. Accordingly, the terminal may receive the fourth information indicating the fourth parameter from the base station, and obtain the fourth parameter according to the fourth information, so as to determine the value of the fourth parameter.

Furthermore, the base station 600 may further include a receiving unit 630. The receiving unit 630 may receive precoding matrix indication information from the terminal. The control unit 610 may generate a precoding matrix according to the precoding matrix indication information. In the present disclosure, the precoding matrix indication information may be PMI. The base station may generate the precoding matrix according to a conventional method of generating a precoding matrix through PMI (e.g., a method specified in a 3GPP standard specification).

With the above-described base station of the embodiment of the present disclosure, feedback overhead related to precoding from the terminal to the base station can be reduced under the condition of applying subcarrier-level precoding, thereby improving performance of the communication system.

It should be noted that the above embodiments of the present disclosure are based on subcarrier-level precoding and/or CSI feedback technology, rather than subband-level precoding and/or CSI feedback technology. The above embodiments of the present disclosure can be applied in a wireless communication system when the wireless communication system supports the subband-level precoding technology. When a wireless communication system only supports the subband-level precoding and CSI feedback technology and does not support the subcarrier-level precoding and/or CSI feedback technology, the above embodiments of the present disclosure cannot be applied to the wireless communication system. For example, the first parameter ($M_{max}$) in the above-described embodiments of the present disclosure may be ignored, and the second parameter ($M_v$) and the fourth parameter ($M_{initial}$) may be determined in a manner defined by Release 16 (R16) of NR specified in a wireless communication standard specification (e.g., 3GPP standard specification).

In addition, according to another embodiment of the present disclosure, the terminal may report a value of a rank for the terminal to the base station, and the value of the rank for the terminal may be a positive integer greater than or equal to four. For example, the base station may transmit constraint information (such as rank constraint information) to the terminal, which is used to indicate whether the base station allows the terminal to transmit information related to certain values of the rank (such as PMI and/or Rank Indicator (RI)) to it, and these certain values may be positive integers greater than or equal to four. After receiving the constraint information, the terminal may transmit response information to the base station, which is used to indicate the value of the rank for the terminal, and the value of the rank for the terminal may be a positive integer greater than or equal to four.

In this example, the constraint information may be typeII-RI-Restriction-rX specified by a wireless communication standard specification (e.g., 3GPP standard specification), where "rX" represents the release serial number of the communication system. For example, in the example where the release serial number of the communication system is NR Release 17 (R17), the parameter may be typeII-RI-Restriction-r17.

Furthermore, according to an example of the present disclosure, the data type and the number of bits of typeII-RI-Restriction-rX may be defined as:

typeII-RI-Restriction-rX BIT STRING (SIZE (n))

where, n may represent a maximum number of data streams transmitted at the same time that the terminal can support, and its value may be related to (e.g., equal to) a maximum value of the rank. For example, when the maximum value of the rank for the terminal is 4, the value of n may be 4. Accordingly, the data type and the number of bits of typeII-RI-Restriction-rX may be defined as:

typeII-RI-Restriction-rX BIT STRING (SIZE(4)).

As another example, when the maximum value of the rank for the terminal is 6, the value of n may be 6. Accordingly, the data type and the number of bits of typeII-RI-Restriction-rX may be defined as:

typeII-RI-Restriction-rX BIT STRING (SIZE(6)).

Further, in this example, the response information may be rank indication information, for example, rank indicator (RI). In an example where the response information is RI, the terminal may include RI in a CSI report and transmit the CSI report to the base station, thus realizing report of the rank value for the terminal to the base station.

In addition, the terminal 500 and the base station 600 described above may be used to implement this other embodiment. For example, the transmitting unit 620 of the base station 600 may transmit constraint information (e.g., typeII-RI-RestRIction-rX) to the terminal 500, which is used to indicate whether the base station 600 allows the terminal 500 to transmit information related to certain values of the rank (e.g., PMI and/or Rank Indicator (RI)) to it, and these certain values may be positive integers greater than or equal to four. The receiving unit 510 of the terminal 500 receives the constraint information, and the transmitting unit 530 of the terminal 500 may transmit response information (e.g., RI) to the base station, which is used to indicate the value of the rank for the terminal, and the value of the rank for the terminal may be a positive integer greater than or equal to four. In this way, when the rank value for the terminal is greater than or equal to four, the terminal may report the rank value for the terminal to the base station.

Hardware Structure

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 7:
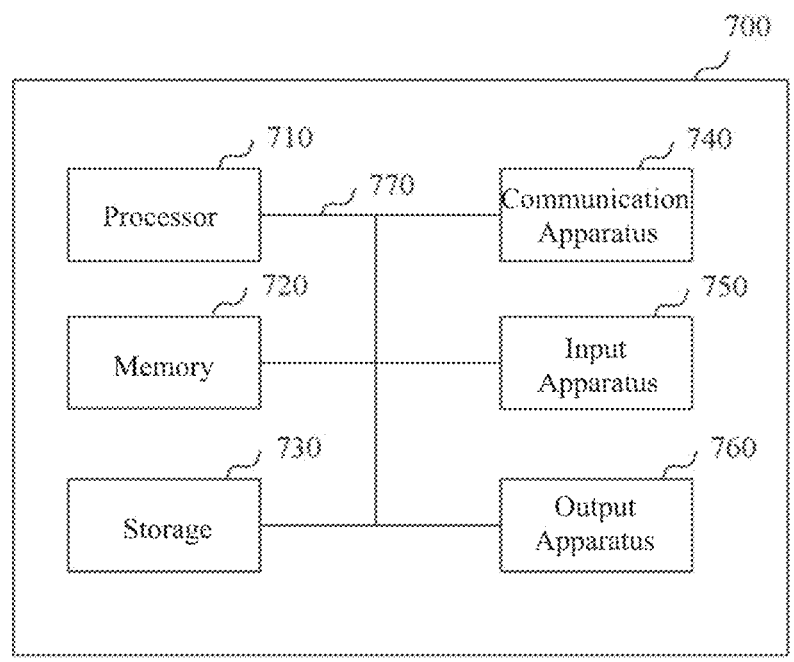
FIG. 7 is a schematic diagram of a hardware structure of a communication device according to an embodiment of the present disclosure.

For example, a communication device (e.g., the terminal 500, the base station 600) in an embodiment of the present disclosure may function as a computer that executes the processes of the wireless communication method of the present disclosure. FIG. 7 is a schematic diagram of a hardware structure of a communication device 700 (a base station or terminal) involved in an embodiment of the present disclosure. The above device 700 may be constituted as a computer apparatus that physically comprises a processor 710, a memory 720, a storage 730, a communication apparatus 740, an input apparatus 750, an output apparatus 760, a bus 770 and the like In addition, in the following description, terms such as "apparatus" may be replaced with circuits, devices, units, and the like. The hardware structure of the user terminal and the base station may include one or more of the respective apparatuses shown in the figure, or may not include a part of the apparatuses.

For example, only one processor 710 is illustrated, but there may be multiple processors. Furthermore, processes may be performed by one processor, or processes may be performed by more than one processor simultaneously, sequentially, or with other methods. In addition, the processor 710 may be installed by more than one chip.

Respective functions of the device 700 may be implemented, for example, by reading specified software (program) on hardware such as the processor 710 and the memory 720, so that the processor 710 performs computations, controls communication performed by the communication apparatus 740, and controls reading and/or writing of data in the memory 720 and the storage 730.

The processor 710, for example, operates an operating system to control the entire computer. The processor 710 may be constituted by a Central Processing Unit (CPU), which includes interfaces with peripheral apparatuses, a control apparatus, a computing apparatus, a register and the like. For example, the control unit described above may be implemented by the processor 710.

In addition, the processor 710 reads programs (program codes), software modules and data from the storage 730 and/or the communication apparatus 740 to the memory 720, and execute various processes according to them. As for the program, a program causing computers to execute at least a part of the operations described in the above embodiments may be employed. For example, the control unit of the terminal 500 may be implemented by a control program stored in the memory 720 and operated by the processor 710, and other functional blocks may also be implemented similarly.

The memory 720 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 720 may also be referred to as a register, a cache, a main memory (a main storage apparatus) and the like. The memory 720 may store executable programs (program codes), software modules and the like for implementing a method involved in an embodiment of the present disclosure.

The storage 730 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 730 may also be referred to as an auxiliary storage apparatus.

The communication apparatus 740 is a hardware (transceiver device) performing communication between computers via a wired and/or wireless network, and is also referred to as a network device, a network controller, a network card, a communication module and the like, for example. The communication apparatus 740 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like of the above terminal 500 described above may be implemented by the communication apparatus 740.

The input apparatus 750 is an input device (e.g., a keyboard, a mouse, a microphone, a switch, a button, a sensor and the like) that receives input from the outside. The output apparatus 760 is an output device (e.g., a display, a speaker, a Light Emitting Diode (LED) light and the like) that performs outputting to the outside. In addition, the input apparatus 750 and the output apparatus 760 may also be an integrated structure (e.g., a touch screen).

Furthermore, the respective apparatuses such as the processor 710 and the memory 720 are connected by the bus 770 that communicates information. The bus 770 may be constituted by a single bus or by different buses between the apparatuses.

Furthermore, the base station and the terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 710 may be installed by at least one of these hardware.

Variations

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal can be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, RRC (Radio Resource Control) signaling, broadcast information (Master Information Blocks (MIBs), System Information Blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a base station in this specification may also be replaced with a user terminal. For example, for a structure in which communication between a base station and a user terminal is replaced with communication between a plurality of user terminals (Device-to-Device, D2D), the respective manners/embodiments of the present disclosure may also be applied. In this case, functions provided by the base station 600 described above may be regarded as functions provided by a user terminal. Furthermore, the words "uplink" and "downlink" may also be replaced with "side". For example, an uplink channel may be replaced with a side channel.

Also, a user terminal in this specification may be replaced with a base station. In this case, functions provided by the above user terminal 500 may be regarded as functions provided by a base station.

In this specification, specific actions configured to be performed by a base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), the 6th generation mobile communication system (6G), Future Radio Access (FRA), New Radio Access Technology (New-RAT), New Radio (NR), New radio access (NX), Future generation radio access (FX), Global System for Mobile communications (GSM®), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "based on at least."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal in a communication system, comprising:
a communication apparatus configured to receive, from a base station in the communication system, first information indicating a first parameter, wherein the first parameter indicates a number of candidate transform domain vectors regarding a subcarrier-level precoding matrix, and a value of the first parameter is smaller than a number of subcarriers of the communication system;
the communication apparatus being further configured to receive, from the base station, second information indicating a second parameter, wherein the second parameter indicates a number of transform domain vectors used to determine the subcarrier-level precoding matrix; and
a processor configured to determine, from the number of candidate transform domain vectors indicated by the first information, the number of transform domain vectors indicated by the second information.

2. The terminal of claim 1, wherein the second information is used to indicate a first factor corresponding to a value of the second parameter.

3. The terminal of claim 1, wherein the processor is further configured to determine precoding matrix indication information according to at least the determined transform domain vectors.

4. The terminal of claim 1, wherein the communication apparatus is further configured to receive, from the base station, indication information indicating a subset of the candidate transform domain vectors, and the processor is configured to determine, from the subset, the number of transform domain vectors indicated by the second information.

5. The terminal of claim 4, wherein the indication information includes third information indicating a third parameter, wherein a value of the third parameter indicates a number of vectors included in the subset of the candidate transform domain vectors.

6. The terminal of claim 5, wherein the indication information includes fourth information indicating a fourth parameter, wherein the fourth parameter is used to determine vectors included in the subset of the candidate transform domain vectors.

7. The terminal of claim 3, wherein
the communication apparatus is further configured to transmit, to the base station, the precoding matrix indication information.

8. The terminal of claim 1, wherein
the communication apparatus is further configured to transmit, to the base station, rank indication information, wherein the rank indication information is used to indicate a rank for the terminal, and a value of the rank for the terminal is greater than or equal to four.

9. A base station in a communication system, comprising:
a processor configured to determine a first parameter, wherein the first parameter indicates a number of candidate transform domain vectors regarding a subcarrier-level precoding matrix, and a value of the first parameter is smaller than a number of subcarriers of the communication system;
the processor being further configured to determine a second parameter, wherein the second parameter indicates a number of transform domain vectors used to determine the subcarrier-level precoding matrix; and
a communication apparatus configured to transmit, to a terminal in the communication system, first information indicating the first parameter and second information indicating the second parameter, so that the terminal determines, from the number of candidate transform domain vectors indicated by the first information, the number of transform domain vectors indicated by the second information.

10. The base station of claim 9, wherein
the communication apparatus is further configured to receive, from the terminal, precoding matrix indication information.

* * * * *